(12) United States Patent
Newman et al.

(10) Patent No.: US 10,078,644 B1
(45) Date of Patent: Sep. 18, 2018

(54) APPARATUS AND METHODS FOR MANIPULATING MULTICAMERA CONTENT USING CONTENT PROXY

(71) Applicant: GOPRO, INC., San Mateo, CA (US)

(72) Inventors: David Newman, San Diego, CA (US); Mark Vaden, San Diego, CA (US); Rolf Fischer, San Diego, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 132 days.

(21) Appl. No.: 15/001,097

(22) Filed: Jan. 19, 2016

(51) Int. Cl.
| | |
|---|---|
| *H04N 7/00* | (2011.01) |
| *H04N 13/00* | (2018.01) |
| *H04N 13/04* | (2006.01) |
| *G06F 17/30* | (2006.01) |
| *H04N 1/00* | (2006.01) |
| *H04N 1/21* | (2006.01) |
| *H04N 5/247* | (2006.01) |

(52) U.S. Cl.
CPC ... *G06F 17/30265* (2013.01); *H04N 1/00209* (2013.01); *H04N 1/2112* (2013.01); *H04N 1/2158* (2013.01); *H04N 5/247* (2013.01)

(58) Field of Classification Search
CPC .......... H04N 5/23206; H04N 5/23245; H04N 5/23241; H04N 13/0242; H04N 5/23238
USPC ............................................. 348/38, 42, 51
See application file for complete search history.

(56) References Cited

U.S. PATENT DOCUMENTS

| | | |
|---|---|---|
| 6,633,685 B1 | 10/2003 | Kusama |
| 7,337,344 B2* | 2/2008 | Barman ................. G06F 3/005 348/E5.015 |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

(Continued)

*Primary Examiner* — Xi Wang
(74) *Attorney, Agent, or Firm* — Sheppard Mullin Richter & Hampton LLP

(57) ABSTRACT

Content proxy may be obtained. Content may include video captured by an action camera. Content proxy may include metadata information obtained contemporaneous with the content and stored in a session container. Content proxy may include lower data rate version of the content (thumbnails). Content proxy information may be viewed and/or analyzed in order to obtain one or more highlights. Content portion corresponding to the highlight may be obtained. Multiple versions of content proxy obtained by multiple cameras may be used to identify, display, and/or share content portions in a multi-camera/multiuser applications.

12 Claims, 19 Drawing Sheets

(56) References Cited

U.S. PATENT DOCUMENTS

| | | | |
|---|---|---|---|
| 8,606,073 | B2 | 12/2013 | Woodman |
| 8,774,560 | B2 | 7/2014 | Sugaya |
| 8,971,623 | B2 | 3/2015 | Gatt |
| 8,990,328 | B1 | 3/2015 | Grigsby |
| 9,041,727 | B2 | 5/2015 | Ubillos |
| 9,142,257 | B2 | 9/2015 | Woodman |
| 9,342,376 | B2 | 5/2016 | Jain |
| 9,418,283 | B1 | 8/2016 | Natarajan |
| 2002/0165721 | A1 | 11/2002 | Chang |
| 2004/0001706 | A1 | 1/2004 | Jung |
| 2005/0025454 | A1 | 2/2005 | Nakamura |
| 2005/0108031 | A1 | 5/2005 | Grosvenor |
| 2005/0198018 | A1 | 9/2005 | Shibata |
| 2006/0080286 | A1 | 4/2006 | Svendsen |
| 2006/0115108 | A1 | 6/2006 | Rodriguez |
| 2006/0266942 | A1* | 11/2006 | Ikeda ............... H04N 5/23238 250/334 |
| 2008/0123976 | A1 | 5/2008 | Coombs |
| 2008/0136899 | A1* | 6/2008 | Eisenberg ............. H04N 7/152 348/14.09 |
| 2008/0183843 | A1 | 7/2008 | Gavin |
| 2009/0019995 | A1 | 1/2009 | Miyajima |
| 2009/0027499 | A1 | 1/2009 | Nicholl |
| 2009/0125559 | A1 | 5/2009 | Yoshino |
| 2009/0252474 | A1 | 10/2009 | Nashida |
| 2010/0046842 | A1 | 2/2010 | Conwell |
| 2010/0086216 | A1 | 4/2010 | Lee |
| 2010/0161720 | A1 | 6/2010 | Colligan |
| 2010/0199182 | A1 | 8/2010 | Lanza |
| 2010/0274714 | A1 | 10/2010 | Sims |
| 2010/0318660 | A1 | 12/2010 | Balsubramanian |
| 2011/0103700 | A1 | 5/2011 | Haseyama |
| 2011/0137156 | A1 | 6/2011 | Razzaque |
| 2011/0170086 | A1 | 7/2011 | Oouchida |
| 2011/0206351 | A1 | 8/2011 | Givoly |
| 2011/0242098 | A1 | 10/2011 | Tamaru |
| 2012/0014673 | A1 | 1/2012 | O'Dwyer |
| 2012/0027381 | A1 | 2/2012 | Kataoka |
| 2012/0030263 | A1 | 2/2012 | John |
| 2012/0141019 | A1 | 6/2012 | Zhang |
| 2012/0210205 | A1 | 8/2012 | Sherwood |
| 2012/0210228 | A1 | 8/2012 | Wang |
| 2012/0246114 | A1 | 9/2012 | Edmiston |
| 2012/0283574 | A1 | 11/2012 | Park |
| 2013/0182166 | A1 | 7/2013 | Shimokawa |
| 2013/0235071 | A1 | 9/2013 | Ubillos |
| 2013/0239051 | A1 | 9/2013 | Albouze |
| 2013/0330019 | A1 | 12/2013 | Kim |
| 2014/0036087 | A1* | 2/2014 | Furue ............... G11B 27/034 348/157 |
| 2014/0118488 | A1* | 5/2014 | Steuart, III ............ G03B 35/08 348/38 |
| 2014/0149865 | A1 | 5/2014 | Tanaka |
| 2014/0152762 | A1 | 6/2014 | Ukil |
| 2014/0282661 | A1 | 9/2014 | Martin |
| 2015/0039646 | A1 | 2/2015 | Sharifi |
| 2015/0071547 | A1 | 3/2015 | Keating |
| 2015/0097980 | A1* | 4/2015 | Cucci ............... H04N 5/23206 348/211.2 |
| 2015/0113009 | A1 | 4/2015 | Zhou |
| 2015/0156247 | A1 | 6/2015 | Hensel |
| 2015/0287435 | A1 | 10/2015 | Land |
| 2016/0029105 | A1 | 1/2016 | Newman |
| 2016/0094601 | A1 | 3/2016 | Besehanic |
| 2016/0103830 | A1 | 4/2016 | Cheong |
| 2016/0189752 | A1 | 6/2016 | Galant |
| 2016/0260000 | A1 | 9/2016 | Yamakawa |
| 2016/0286235 | A1 | 9/2016 | Yamamoto |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Japanese Office Action for JP Application No. 2013-140131, dated Aug. 5, 2014, 6 pages.

Office Action for U.S. Appl. No. 13/831,124, dated Mar. 19, 2015, 14 pages.

PSonar URL: http://www.psonar.com/about retrieved on Aug. 24, 2016, 3 pages.

PCT International Search Report and Written Opinion for PCT/US2015/023680, Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Iandola et al., "SqueezeNet: AlexNet-level accuracy with 50x fewer parameters and <0.5MB model size", arXiv:1602.07360v3 [cs.CV] Apr. 6, 2016 (9 pgs.)

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

* cited by examiner

… (1) …

APPARATUS AND METHODS FOR MANIPULATING MULTICAMERA CONTENT USING CONTENT PROXY

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to capturing, storing, and/or distribution of content such as audio, image, and/or video content and more particularly in one exemplary aspect to computer apparatus and methods for displaying content and metadata and/or using metadata as a proxy for content provided by a capture device.

Description of Related Art

Video and/or image content library of an action camera user may require large information storage and/or communications resources. Content may be obtained by a capture device. Video content may have metadata associated therewith. Metadata may be obtained when recording images, video, and/or audio content by a camera. When performing an activity, duration of video may span a portion of the activity duration due to, e.g., limited storage and/or energy resource of the capture device. When using a mobile communications device it may be desirable to access information related to content in lieu of the content.

SUMMARY

The present disclosure satisfies the foregoing needs by providing, inter alia, apparatus and methods for using metadata to manipulate an imaging content. In one aspect of the disclosure, a computerized system for manipulating imaging content is provided. The system may include one or more of a communications interface, one or more processors, and/or other components.

The communications interface may be in operable communication with an electronic storage apparatus. The electronic storage apparatus may be configured to store a first content acquired by a first source and a second content acquired by a second source.

One or more processors may be in operable communication with the electronic storage apparatus. One or more processors may be configured to access a first content proxy. The first content proxy may include first information related to a location of the first source during acquisition of the first content.

One or more processors may be configured to access a second content proxy. The second content proxy may include second information related to a location of the second source during acquisition of the second content.

One or more processors may be configured to identify, based on the first information and the second information, portions of the first content and portions of the second content captured while the first source and the second source were proximate in space. Identifying portions of the first content and portions of the second content captured while the first source and the second source were proximate in space may include identifying portions of the first content and portions of the second content captured at the same time while the first source and the second source were within a threshold distance of each other. Identifying portions of the first content and portions of the second content captured while the first source and the second source were proximate in space may include identifying portions of the first content and portions of the second content that have fields of view which are at least partially overlapping over an overlap area.

One or more processors may be configured to obtain a first link to the first content. The first link may correspond to a first content portion of the first content acquired by the first source while the first source was proximate in space to the second source.

One or more processors may be configured to obtain a second link to the second content. The second link may correspond to a second content portion of the second content acquired by the second source while the second source was proximate in space to the first source.

One or more processors may be configured to provide the first link and the second link via the commutations interface. The provision of the first link and the second link may be configured to cause receipt of the first content portion and the second content portion from the electronic storage apparatus. In some implementations, the receipt of the first content portion and the second content portion may be configured to effectuate presentation on a display of the first content portion contemporaneous with the second content portion. In some implementations, the first source and the second source may be configured to be disposed spaced from one another during acquisition of at least a portion of the first content and the second content.

In some implementations, the first content portion may include multiple images of a scene from a first viewpoint. The second content portion may include multiple images of the scene from a second viewpoint. The presentation of the first content portion contemporaneous with the second content portion may be configured to provide multiple viewpoint views of the scene.

In some implementations, the first content portion may include multiple images of a scene from a first viewpoint. The second content portion may include multiple images of the scene from a second viewpoint. The presentation of the first content portion contemporaneous with the second content portion may be configured to provide multiple viewpoint views of the scene.

In some implementations, the electronic apparatus storage may be configured to store the first content in a first digital container and to store the second content in a second digital container. The first content proxy may include a first pointer to the first digital container. The second content proxy may include a second pointer to the second digital container. The first link may include the first pointer and the second link may include the second pointer.

In some implementations, the first content proxy may include one or more of first references to one or more of the multiple images of the first content. The second content proxy may include one or more of second references to one or more of the multiple images of the second content. The first link may include at least one of the one or more of the first references such that evaluation of the first link by the electronic storage apparatus may be configured to identify a first image of the one or more of the multiple images of the first content. The first image may contain the scene. The second link may include at least one of the one or more of the second references such that evaluation of the second link by the electronic storage apparatus may be configured to identify a second image of the one or more of the multiple images of the second content. The second image may contain the scene.

In some implementations, the at least one of the one or more of the first references may include first time information for a first frame. The at least one of the one or more of the second references may include second time information for a second frame.

In some implementations, the first source may include a first camera device. The first camera device may be configured to be displaced along a first trajectory as a part of the acquisition of the first content. The second source may include a second camera device. The second camera device may be configured to be displaced along a second trajectory as a part of the acquisition of the second content. The overlap area may correspond to an area wherein the first trajectory is within a target range from the second trajectory. In some implementations, the first time information may be associated with a first acquisition time of the first frame by the first camera device when the first trajectory may be within the overlap area. The second time information may be associated with a second acquisition time of the second frame by the second camera device when the second trajectory may be within the overlap area. In some implementations, the second acquisition time may be spaced from the first acquisition time by at a time interval of least 60 seconds.

In one aspect of the disclosure, a computerized action camera apparatus is provided. The computerized action camera apparatus may include one or more an imaging sensor, a location component, a communications interface, an electronic storage, one or more processors, and/or other components.

The imaging sensor may be configured to generate output signals. The output signals may convey a series of images to produce a first content.

The location component may be configured to obtain information related to a location of the computerized action camera apparatus during acquisition the first content. In some implementations, the location component may include a global positioning system receiver, and the information related to the location of the computerized action camera apparatus may include latitude, longitude and time associated therewith. In some implementations, the information related to the location of the computerized action camera apparatus may include camera elevation, and the given range may include a range of elevation.

The communications interface may be configured to communicate information with an external device. The electronic storage may be configured to store the first content and the information related to the location.

One or more processors configured to evaluate the information related to the location to obtain a first time record of location of the computerized action camera apparatus and a second time record of location of the external device. One or more processors configured to, based on the evaluation, determine a time window wherein a first location of the computerized action camera apparatus may be within a given range from a second location of the external device.

One or more processors configured to evaluate the first time record to obtain a first time instance corresponding to the first location. One or more processors configured to evaluate the second time record to obtain a second time instance corresponding to the second location. One or more processors configured to obtain a time offset based on a difference operation using the first time instance and the second time instance.

One or more processors configured to provide the time offset to a content manipulation process. The time offset provision may be configured to enable synchronous presentation of the first content contemporaneously with a second content. The second content may be obtained by the external device.

In some implementations, the first content may include multiple first images. Individual ones of the multiple first images may be characterized by image time instances. Provision of the time offset to the content manipulation process may be configured to enable modification of the image time instances of the individual ones of the multiple first images using the time offset so as to obtain a time synchronized version of the first content relative the second content. In some implementations, the second content may include multiple images acquired by the external device.

In one aspect of the disclosure, a non-transitory computer readable medium is provided. The non-transitory computer readable medium may be configured to store a plurality of computer-readable instructions. The plurality of computer-readable instructions may be executed by one or more processors.

The plurality of computer-readable instructions, when executed by one or more processors, may be configured to access a first content proxy containing information related to a first imaging content. The first imaging content may be acquired by a first capture device having a first clock associated therewith. The first imaging content may include a first sequence of images. The first content proxy may include (i) a second sequence of images characterized by a first data rate configured lower than a second data rate of the first sequence of images, and (ii) one or more links to the images of the first sequence of images. In some implementations, the first data rate may be configured based on a fewer number of images per given time interval within the second sequence of images compared to a number of images per given time interval within the first sequence of images. In some implementations, the first data rate may be configured based on a lower number bytes per image of the second sequence of images compared to a number of bytes per image within the first sequence of images.

The plurality of computer-readable instructions, when executed by one or more processors, may be configured to access a second content proxy containing information related to second imaging content. The second imaging content may be acquired by a second capture device having a second clock associated therewith. The second imaging content may include a third sequence of images. The second content proxy may include (i) a fourth sequence images characterized by a third data rate configured lower than a fourth data rate of the third sequence of images, and (ii) one or more links to the images of the third sequence of images. In some implementations, the third data rate may be configured based on one or both of (i) a fewer number of images per given time interval within the fourth sequence of images compared to a number of images per given time interval within the third sequence of images; and (ii) a lower number bytes per image of the fourth sequence of images compared to a number of bytes per image within the third sequence of images.

The plurality of computer-readable instructions, when executed by one or more processors, may be configured to evaluate the images of the second sequence to obtain parameters related to one or more first scenes. The plurality of computer-readable instructions, when executed by one or more processors, may be configured to evaluate the images of the fourth sequence to obtain parameters related to one or more second scenes.

The plurality of computer-readable instructions, when executed by one or more processors, may be configured to obtain an overlap between the one or more first scenes and the one or more second scenes such that a given scene occurring within the one or more first scenes occurs within the one or more second scenes.

The plurality of computer-readable instructions, when executed by one or more processors, may be configured to obtain a first link to an image of the first sequence of images corresponding to the given scene occurring within the one or more first scenes. The plurality of computer-readable instructions, when executed by one or more processors, may be configured to obtain a second link to an image of the third sequence of images corresponding to the given scene occurring within the one or more second scenes.

The plurality of computer-readable instructions, when executed by one or more processors, may be configured to provide the first link and the second link to a display process. The provision of the first link and the second link may be configured to enable contemporaneous display of the given scene using the image of the first sequence of images and the image of the second sequence of images.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1A:
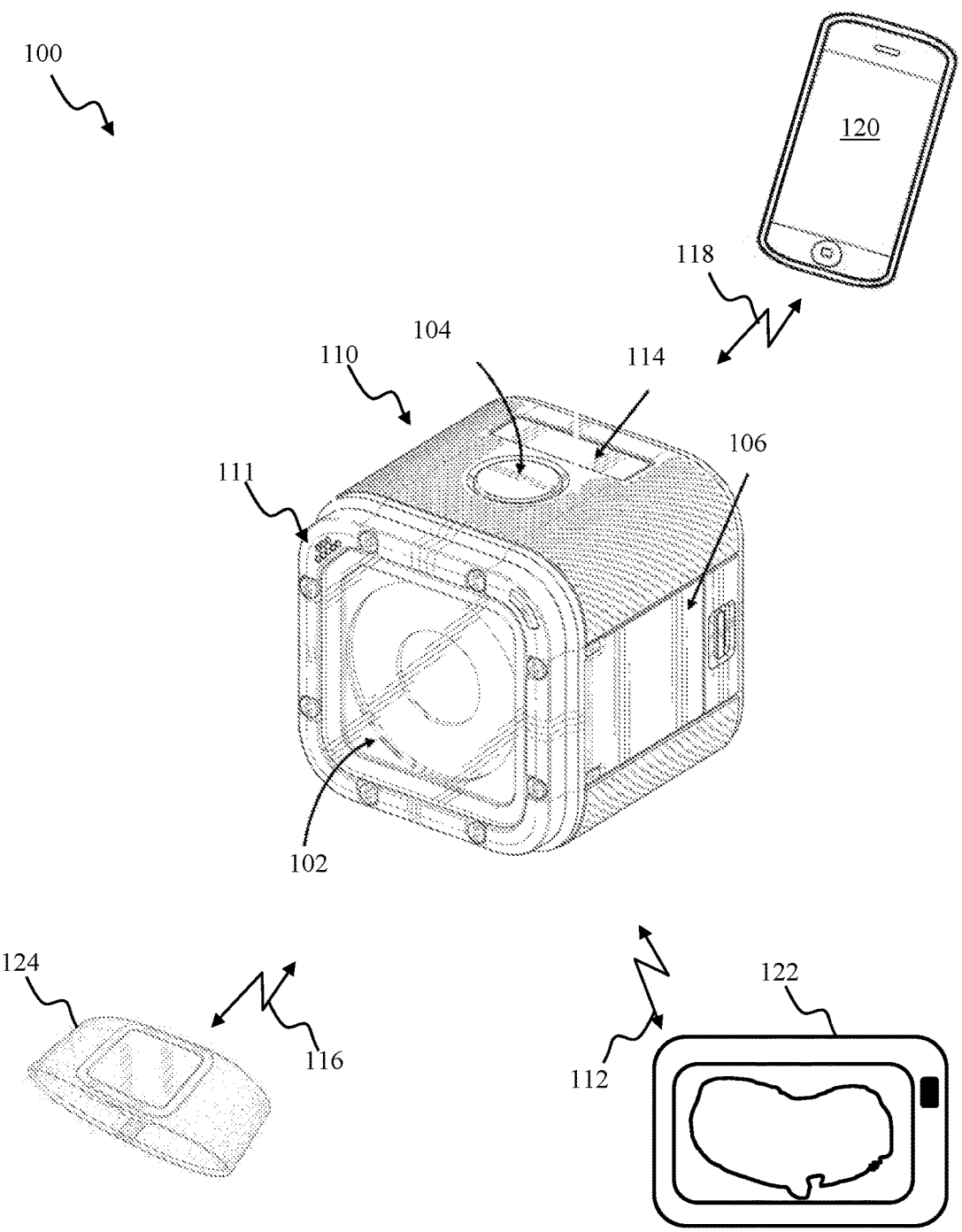
FIG. 1A is a functional block diagram illustrating an action camera interfaced to metadata sources, in accordance with one implementation.

All Figures disclosed herein are © Copyright 2016 GoPro Inc., All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

Capture devices, such as action video cameras (e.g., GoPro HERO4 Silver) may be used in a variety of application where collecting data other than the video track may be of use. The non-video information (also referred to as the metadata) may include e.g., camera orientation, camera location, camera motion, time of day, season, ambient light conditions, weather parameters (e.g., wind speed, direction, humidity), user activity (e.g. running, biking, surfing), image acquisition parameters (e.g., white balance, image sensor gain, sensor temperature, exposure time, lens aperture, bracketing configuration (e.g., image exposure bracketing, aperture bracketing, focus bracketing), and/or other parameters), user statistics (heart rate, age, cycling cadence), Highlight Tags, image acquisition settings (e.g., white balance, field of view, gain, lens aperture, tonality curve used to obtain an image, exposure time, exposure compensation, and/or other image acquisition parameters), device and/or shot identification (ID) used in, e.g., multi-camera arrays, and/or practically any parameter that may be measured and/or recorded during video acquisition. In some implementations, metadata may include information related to proximity of other capture devices including e.g., device ID, status (e.g., recoding video, metadata, standby), range to the device, duration of device proximity occurrence, and/or other information.

Metadata information may be provided by one or more internal camera components and/or external components, e.g., as shown and described in detail with respect to FIGS. 1A-1B, below. Various sources of information may be utilized with the methodology of the present disclosure, including but not limited to telemetry pucks, vehicle telemetry information (e.g., brake pressure, engine RPM, vehicle speed, altitude, on board diagnostics parameters, and/or other vehicle parameters), information related to other capture devices that may occur in a vicinity (e.g., Bluetooth proximity information, radio frequency signal strength, ID of a neighboring capture device, and/or other capture device (s) information).

When acquiring video, e.g., using an action camera device such as GoPro HERO3, HERO4, additional information that may be related to the video acquisition session may be obtained and stored. In some implementations, such information may include camera sensor image acquisition parameters (e.g., exposure, white balance, gain), camera orientation, camera location, camera motion, time of day, season, ambient light conditions, audio information, evaluation of activity being filmed (e.g., surfing, biking), ambient temperature, user body parameters (e.g., heart rate, cadence) and/or any other parameter that may be conceivably related to the activity being filmed.

Existing metadata acquisition solutions often record metadata when video being obtained and/or recorded. Such configuration may provide an additional demand on computational and/or energy resources of the capture device.

The present disclosure provides for information storage container (referred to as "session file" and/or "session container") that may be configured to store metadata. IN some implementations, the session container may be implemented as a multimedia container (e.g., MOV, MP4) configured to store metadata without video being present. In one or more implementations, the session container may be configured to store in a metadata track metadata captured over a given time duration together with and one or more content clips spanning a portion of the time duration. As used herein the term content may be used to refer to video, still images, bursts of images, audio, and/or a combination thereof. The content clips may be configured discontinues and/or continuous with one another. Combined duration of the clips may be configured shorter than the duration of the metadata track.

FIG. 1A illustrates a GoPro camera interfaced to metadata sources, in accordance with one implementation. The camera apparatus 110 of the system 100 may include one or more GoPro action cameras, e.g., HERO4 Silver. The camera apparatus 110 may house one or more internal metadata sources, e.g., video, inertial measurement unit, global positioning system (GPS) receiver component and/or other metadata source. In some implementations, the apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, the foregoing being incorporated herein by reference in its entirety. The apparatus 110 may comprise one or optical elements 102. Individual optical elements 102 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The apparatus 110 may include one or more microphones (e.g., 111 in FIG. 1A) configured to provide audio information that may be associated with images being acquired by the image sensor.

The camera apparatus 110 may be interfaced to an external heartrate monitor device 124 via wireless link 116; to an external device 112 (comprising e.g., GPS receiver, cycling computer, metadata puck, and/or other device configured to provide information related to system 100 and/or its environment) via wireless link 112. The camera apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera apparatus 110.

In one or more implementations, individual links 116, 112, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 116, 112, 118 may be effectuated using a wired interface, e.g., HDMI, USB, digital video interface, display port interface (e.g., digital display interface developed by the Video Electronics Standards Association (VESA), Ethernet, Thunderbolt, and/or other interface.

In some implementations (not shown) one or more external metadata devices may interface to the apparatus 110 via a wired link, e.g., HDMI, USB, coaxial audio, and/or other interface. In one or more implementations, the camera apparatus 110 may house one or more sensors (e.g., GPS, pressure, temperature, heart rate, and/or other sensors). The metadata obtained by the camera apparatus 110 may be incorporated into the combined multimedia stream using any applicable methodologies including those described herein.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly your camera software, and/or perform other functions. Various methodologies may be utilized for configuring the camera apparatus 110 and/or displaying the captured information including these described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

In some implementation, the user interface device 120 may communicate additional information (metadata) to the camera apparatus 110. By way of an illustration, the device 120 may provide location, speed, environmental information (e.g., weather conditions, temperature), and/or other information for use with presentation of the video being captured by the camera apparatus 110.

The user interface device 120 may be configured to receive (e.g., via the link 118) information related to the video being captured by the camera 110. In some implementations, the information may comprise full resolution (e.g., 3840 pixels by 2160 pixels at 60 fps) video stream and/or clips, lower-resolution (e.g., 1280×720 pixels) and/or lower frame rate (e.g., 30 fps) video stream and/or clips, video duration (e.g., elapsed recoding time), metadata (e.g., heart rate provided by the device 124), session container file containing metadata, metadata with thumbnails, and/or metadata with individual video clips and/or images, and/or other information. The user interface device 120 may provide metadata (e.g., position and/or speed provided by the device 120 GPS receiver) for use (e.g., overlay display) with the received video and/or incorporation into a multimedia stream.

The camera apparatus 110 may comprise a display 114 configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The camera apparatus 110 may comprise a display user interface component (e.g., button 114) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

The camera apparatus 110 may comprise a housing access component (e.g., door and/or cover 106). The component 106 may enable access to one or more internal ports of the apparatus 110 such as, e.g., power connector, storage component (e.g., memory card), communications interface (e.g., HDMI, USB, audio, and/or other interface).

Figure 1B:
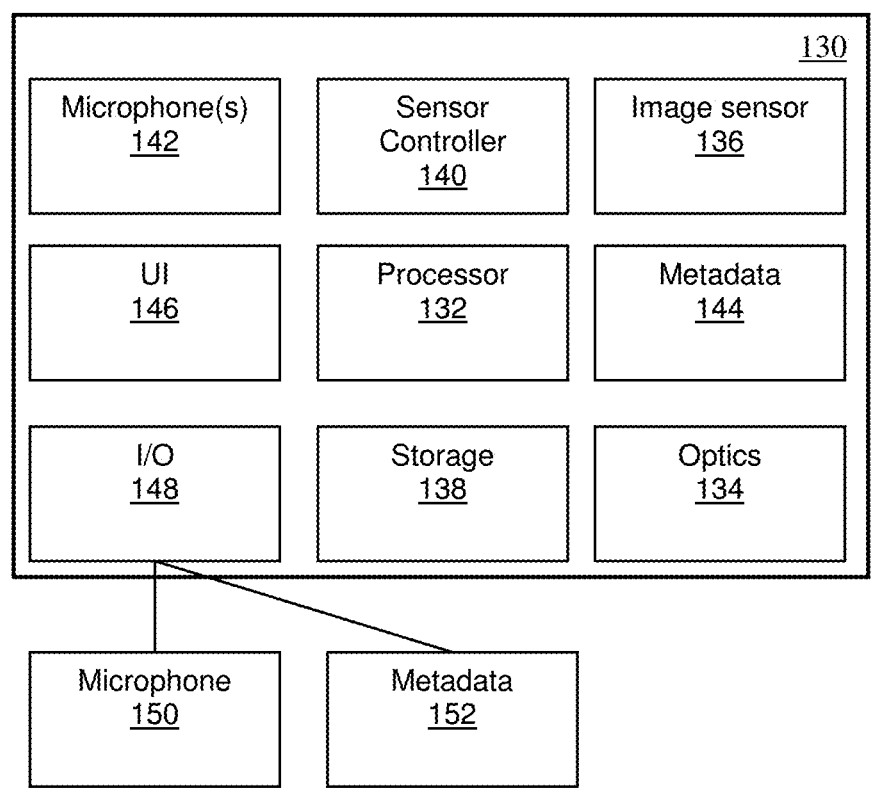
FIG. 1B is a functional block diagram illustrating a capture device for use with, e.g., system of FIG. 1A in accordance with one implementation.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the module 134 may implement focus controller functionality configured to control the operation and configuration of the camera lens. The optics module may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optical module and to produce image(s) data based on control signals from the sensor controller 140. Optics module may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include without limitation, video, audio, capacitive, radio, vibrational, ultrasonic, infrared sensors, radar, LIDAR and/or sonar, and/or other sensory devices.

The apparatus 130 may include one or more microphones embodied within the camera (e.g., 142) and/or disposed external (e.g., 150) to the camera. Microphones may provide audio content information.

The apparatus 130 may include a sensor controller module 140. The module 140 may be used to operate the image sensor 136. The controller may receive image or video input from the image sensor 136; audio information from one or more microphones, such as 150, 142. In some implementations, audio information may be encoded using e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www-.digitalbrainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally (152) to the camera. The processor 132 may interface to the sensor controller and/or one or more metadata modules 144. Metadata modules 144, 152 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata modules 144, 152 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure.

In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processing module 132 may interface to the sensor controller 140 in order to obtain and process sensory information for, e.g., object detection, face tracking, stereo vision, and/or other tasks.

The processing component 132 may interface with the mechanical, electrical sensory, power, and user interface 146 modules via driver interfaces and/or software abstraction layers. Additional processing and memory capacity may be used to support these processes. It will be appreciated that these components may be fully controlled by the processing module 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz).

The memory and processing capacity may aid in management of processing configuration (e.g., loading, replacement), operations during a startup, and/or other operations. Consistent with the present disclosure, the various components of the system 250 may be remotely disposed from one another, and/or aggregated. For example, one or more sensor components may be disposed distal from the capture device, e.g., such as shown and describe with respect to FIG. 1A. Multiple mechanical, sensory, or electrical units may be controlled be a learning apparatus via network/radio connectivity.

The apparatus 130 may include user interface (UI) module 146. The user interface module 146 may comprise virtually any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The interface 148 may be is configured to synchronize the capture device 130 with other cameras and/or with other external devices, such as a remote control, a second capture device 130, a smartphone, a client device 120 of FIG. 1A and/or a video server. The module 148 may be configured to communicate information to/from various I/O components. In some implementations the module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 122, 120 in FIG. 1A and/or metadata source 152 in FIG. 1B. In some implementations, the module 148 may interfaces with LED lights, a display 114, buttons 104 shown in FIG. 1A, microphones such as microphones 150 of FIG. 1B, speakers, and/or other I/O components. In one or more implementations, the interface 148 may interface to energy source, e.g., battery and/or DC electrical source. The communications interface of the apparatus 130 may include one or more connections to external computerized devices to allow for, inter alia, configuration, management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be appropriate.

Figure 2A:
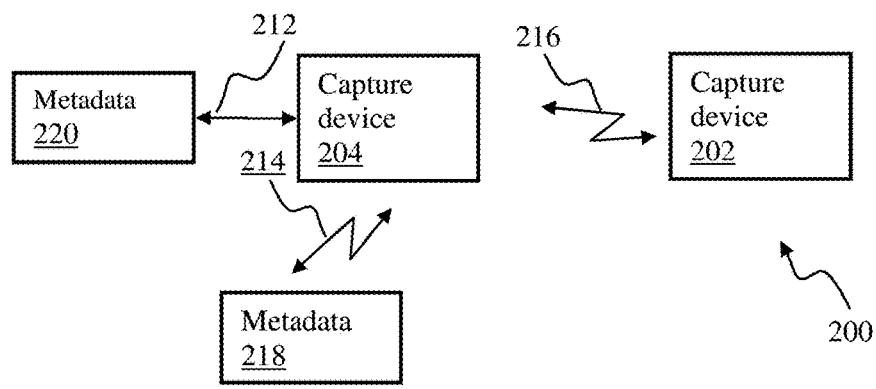
FIG. 2A is a functional block diagram illustrating a system for metadata and content acquisition in accordance with one implementation.
Figure 2B:
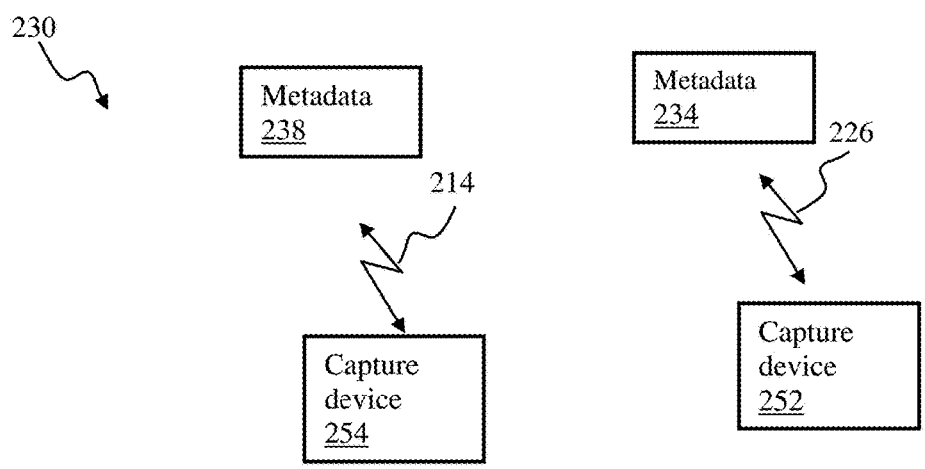
FIG. 2B is a functional block diagram illustrating a system for metadata acquisition comprising multiple capture devices, in accordance with one implementation.
Figure 2C:
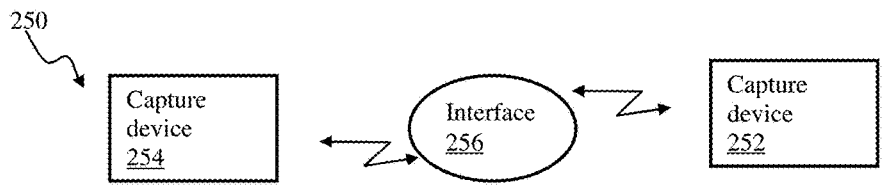
FIG. 2C is a functional block diagram illustrating a system for metadata communication between capture devices in accordance with one implementation.

FIGS. 2A-2C illustrate systems for metadata acquisition in accordance with some implementations. Systems such as shown and described with respect to FIGS. 2A-2C and/or capture devices of FIGS. 1A-1B may be utilized for metadata and content capture during an activity. In one or more implementations, the activity may be characterized by a location in space and duration in time, e.g. such as capturing video and/or photo during an event such as concert, performance, sports event, construction site, social gathering, and/or other event where a capture device may remain at a given location for a period of time. In event recording applications, the metadata container may provide information related to a timeline of the event, environmental conditions, proximity of other capture devices and/or other information. In some implementations, the activity may be characterized by a trajectory in space, during endurance car race, bike ride/race, mountaineering, skiing/snowboarding, hiking, boating, skydiving, flight of an aerial vehicle, and/or other activity where capture device may move in space.

FIG. 2A illustrates a system 200 comprised of two capture devices. Individual capture devices 202, 204 may correspond to an action camera 110 of FIG. 1 A, device 130 described with respect to FIGS. 1A-1B, respectively, and/or other device configured to capture content and metadata. The system of FIG. 2 may be utilized by a user to capture metadata and content while performing an activity e.g., traversing a trajectory 600, shown and described with respect to FIG. 6A, on a bicycle and/or other vehicle, surfing, mountaineering, chiming, hiking, flying an aerial vehicle, and/or partially any activity that may be characterized by a trajectory. In some implementations, the activity may include collecting metadata and/or content using a stationary capture device (e.g., during an event, a show, at a construction site, and/or other activity characterized by time duration).

As shown in FIG. 2A, the capture device 204 may be interfaced to external metadata sources 220, 218 via links 212, 214, respectively. Metadata sources 220, 218 may include any applicable metadata source, e.g., 124, 122, 120, 152 described herein, and/or other sources including e.g., GPS receiver, cycling computer, car computer, metadata puck, a mobile device (e.g., smart phone providing traffic information), and/or other device configured to provide information related to activity being performed. In one or more implementations, individual links 212, 214 may utilize any practical wireless and/or wired interface. By way of a non-limiting illustration, the metadata source 220 may comprise a vehicle computer (e.g., cycling computer, car computer) interfaced to the capture device 204 via a serial bus interface 212. The metadata source 218 may comprise a heart rate monitor worn by a user. The source 218 may communicate with the capture device 204 via wireless link 214 (e.g., WiFi, BT, NFC, ANT+, and/or other link). It will be recognized by those skilled in the arts that these examples serve to illustrate applications of the disclosure and various other metadata source configurations may be utilized with a capture device (e.g., multiple wired and/or wireless sources connected to a given capture device). As described with respect to FIGS. 1A-1B, capture devices (e.g., 202, 204) may include one or more internal metadata sources. In one or more implementations, such metadata sources may include one or more sensors e.g., GPS, pressure, temperature, heart rate, and/or other sensors. The metadata obtained by the capture devices 202, 204 may be incorporated into the combined multimedia stream using any applicable methodologies including those described herein.

Individual capture device 202, 204 may be configured to store captured metadata and/or content in a session file and/or multimedia file. In some implementations, the metadata and the content may be stored internally by a respective capture device (e.g., content captured by the device 204 may be stored on internal storage of the device 204).

In order to obtain context for the stored content, metadata may be utilized. In some implementation, wherein metadata and content capture may be performed by multiple capture devices, metadata may be communicated from one device to another. By way of an illustration, metadata information available to device 204 may be communicated to device 202 via remote link 216 (e.g., WiFi, BT, NFC, ANT+, and/or other link). In some implementations, wherein device 202 may include internal metadata source(s) that may provide data relevant to activity being captured (e.g., IMU data), such metadata information may be communicated to device 204 via the link 216.

FIG. 2B illustrates a system comprising two capture devices. Individual capture devices 252, 254 in FIG. 2B may be coupled to one or more metadata sources 238, 234 via wireless communication links 214, 226. In one or more implementations, individual links 226, 214 may utilize any practical wireless interface, e.g., (e.g., WiFi, BT, NFC, ANT+, and/or other link). By way of a non-limiting illustration, the metadata source 238 may comprise a heart rate sensor; the metadata source 234 may correspond to a mobile communications device (smartphone, cycling computer and/or other device. Metadata and/or content captured by capture devices 254, 252 in FIG. 2B may be stored by a respective device (e.g., heart rate stored by the device 254, cycling statistics by the device 252). In some implementations, individual devices 252, 254 may correspond to one or more devices 110, 1130 of FIGS. 1A-1B, 202, 204 of FIG. 2A and/or other devices.

FIG. 2C illustrates a system 250 configured to enable information transfer between two capture devices 252, 254. Individual capture devices 252, 254 may correspond to any applicable capture device including devices 110, 130, 202, 204, described with respect to FIGS. 1A-1B, 2A-2B. In FIG. 2B device 254 may be coupled to device 252 via interface 256. In some implementations, the interface 256 may comprise a wireless (e.g., WiFi access point) or a wired interface (e.g., USB hub). The system 250 may be utilized post capture by a user of capture device 254 in order to obtain a session metadata file comprising information captured by the device 254 and metadata captured by another capture device, e.g., 252. By way of an illustration, two users may use their own capture devices during a hike/climb, and/or a bike ride. After the activity (post capture) users may link their capture devices via a WiFi hub. Devices may be configured to communicate metadata related to the activity. Metadata received from another capture device (e.g., 254) may be combined with the metadata captured by the device 252 and stored by the device 252.

Referring now to FIGS. 3A-4C metadata container is described in accordance with some implementations of the disclosure. Information storage configurations shown and described with respect to FIGS. 3A-4C may utilized for metadata and content capture during an activity. In one or more implementations, the activity may be characterized by a location in space and duration in time, e.g. such as capturing video and/or photo during an event such as concert, performance, sports event, construction site, social gathering, and/or other event wherein a capture device may remain at a given location for a period of time. In some implementations, the activity may be characterized by a trajectory in space, during endurance car race, bike ride/race, mountaineering, skiing/snowboarding, hiking, boating, skydiving, flight of an aerial vehicle, and/or other activity where capture device may move in space.

Figure 3A:
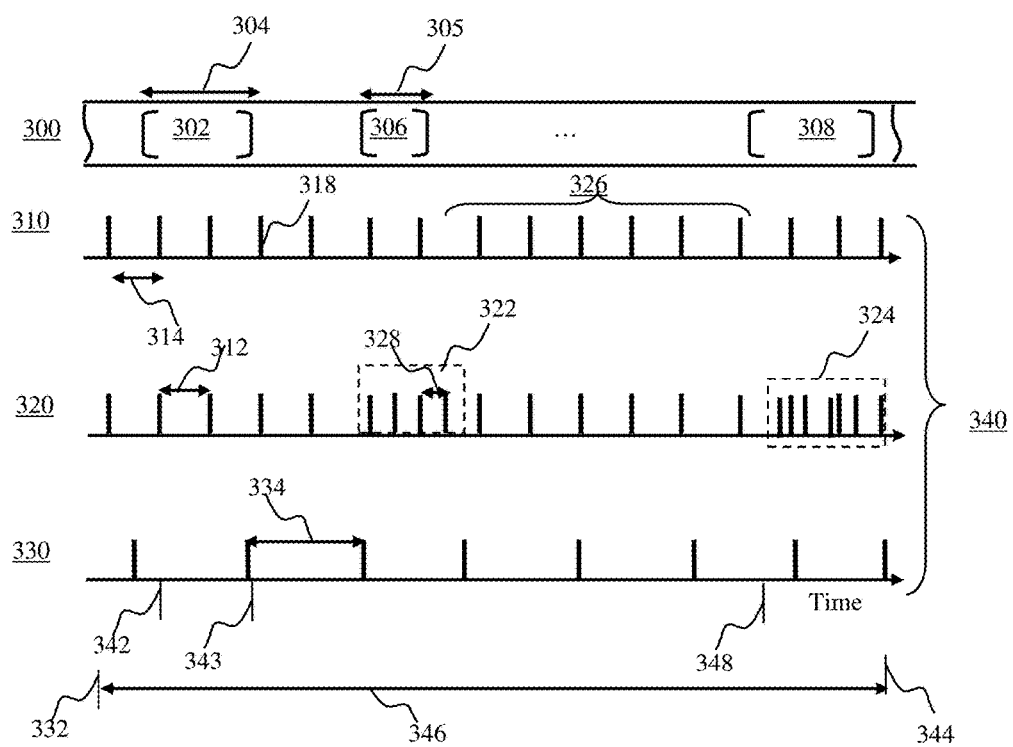
FIG. 3A is a graphical illustration depicting continuing collection of metadata contemporaneously with intermittent acquisition of content by e.g., a capture device of FIG. 1B in accordance with one implementation.

FIG. 3A illustrates continuing collection of metadata contemporaneously with intermittent acquisition of content by e.g., a capture device of FIGS. 1A-1B in accordance with some implementations. Timeline 310 denotes a content track comprising content portions 302, 306, 308 or other content. In some implementations, individual portions 302, 306, 308 may correspond to video clips characterized by duration 304, 305, bursts of photos, audio recordings, and/or combination thereof. Individual video clips may be captured within time duration 346. Individual video clips may be spaced form one another by time intervals. In some implementations, two or more clips may occur adjacent to one another. Content track may comprise video frames characterized by resolution (e.g., 4000×3000 pixels, 1920×1080 pixels and/or other resolution) and a frame rate. In some implementations, the framerate may be selected between 20 fps and 240 fps. It will be recognized by those skilled in the arts that the above values are provided for illustrating methodology of the present disclosure and other resolution and/or framerate values may be utilized commensurate with a given application.

Timelines 310, 320, 330 denote metadata records (also may be referred as channels) that may be captured within the time duration 346. Metadata channels 310, 320, 330 may collectively form a metadata track 340. Individual vertical marks (e.g., 318) denote time instances of metadata capture for a given channel. Individual metadata channel may correspond to a parameter provided by a metadata source (e.g., 124, 122, 120 in FIG. 1A, 153, 154, 160, 162 in FIG. 1B-2A, and/or other source. Some metadata channels may be characterized by sampling rate that may be slower than the framerate of the context track (e.g., heart rate may be updated at 1 Hz, position information may be provided at 10 Hz for video at framerate of 30 fps). Some metadata channels may be sampled at sampling rate that may be selected to exceed the framerate, e.g., camera acceleration and/or orientation may be sampled at a rate selected between 1000 Hz and 10000 Hz in order to, e.g., provide image stabilization information. Some metadata channels (e.g., gain, white balance) may be obtained at sampling rate that may be selected comparable to the framerate (e.g., once per frame, or once per several frames).

Returning now to FIG. 3A, time instance 332 may indicate commencement of metadata and/or content capture; time instance 344 may indicate cessation of metadata and/or content capture. Information presented by timelines 310, 320, 330 may correspond to respective metadata sources, e.g., speed, acceleration, GPS position, heart rate, elevation, and/or other information. Information presented by individual timelines 310, 320, 330 may be characterized by a respective update rate (sampling intervals depicted by arrows 314, 334). In some implementations (e.g., such as shown by timeline 310), the sampling interval (e.g., 314) may remain a constant during metadata recording duration. In some implementations (e.g., such as shown by timeline 320), the sampling interval may be adjusted based on evaluation of metadata value(s) for that channel (e.g., 320) and/or other channels. By way of an illustration, based on a determination that one or more metadata channel values may breach one or more thresholds (e.g., acceleration above a given value indicative of a jump, and/or tight turns), the sampling rate of one or more metadata channels may be adjusted, e.g., as shown by a decrease of the sampling interval of channel 320 during time instances denoted by broken line rectangles 322, 324. Length of arrow 328 is smaller than length of arrow 312 indicating a higher sampling rate (shorter sample interval). In some implementations, duration of a session (346 in FIG. 3A) may vary and/or be configured in accordance with parameters of a given application (e.g., target file size (e.g., 2 gigabytes GB), target duration (e.g., 3600 seconds) and/or other parameters.

Figure 6A:
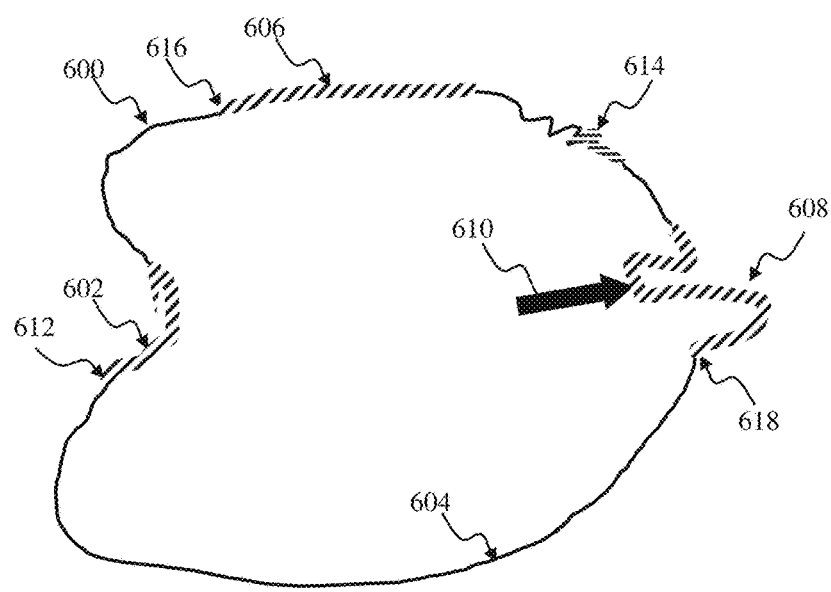
FIG. 6A is a graphical illustration depicting a trajectory traversal by a capture device during metadata and content acquisition in accordance with one implementation.

By way of an illustration, a user may use a capture system 100 of FIG. 1A while riding a bike along a trajectory 600 shown in FIG. 6A. At time instant 332, the system 100 may commence metadata capture and/or recording. In some implementations, the commencement may be caused based on an event, e.g., double press of button (e.g., 104 in FIG. 1A), speed above a given threshold, location change, audible indication (e.g., "START METADATA") and/or other event. At time instants 342, 346, 348 the system 100 may commence video capture and/or recording. In some implementations, the commencement may be caused based on an event, e.g., press of button (e.g., 104 in FIG. 1A), detecting speed, acceleration and/or other parameter breaching a given threshold, location change, audible indication (e.g., "START VIDEO") and/or other event. Video may be captured for a given time duration (e.g., 304, 305). In some implementations, the video clip duration may be based on a detection of another event, e.g., 343 corresponding to e.g., another press of the button, detecting speed, acceleration and/or other parameter breaching another threshold, audible indication (e.g., "STOP VIDEO") and/or other event. By way of a non-limiting illustration, a rider may configure the capture system to automatically instantiate video clip recording when speed and/or acceleration may exceed given criteria. In one or more implementations, the video clip duration may be pre-configured by a user (e.g., 15 seconds), and/or selected based on evaluation of past durations (e.g., average of last 3, repeat of last duration, and/or other operations), based on analysis of metadata (e.g., select clip duration corresponding to a given acceleration and/or speed range, location and/or other criteria). By way of a non-limiting illustration when riding the trajectory 600 over several repetitions, the capture system may determine location 616 and instantiate recording of video for duration 305.

As illustrated in FIG. 3A, metadata capture interval may be decoupled from content capture interval(s). Specifically, metadata may be continuously captured for the duration of the interval 346 including during interval 326 in between content clips 308, 306 Such metadata capture and/or storage may enable to obtain a context for content being acquired during activity. In some implementations, the context may include trajectory associated with content. Referring now to FIG. 6A, continuing acquisition of GPS location and/or speed may enable to obtain trajectory for the whole ride, shown by thin curve 600 in FIG. 6A. Trajectory portions indicated by hashed curve segments 602, 606, 608 may correspond to time intervals when content may be acquired (e.g., video clips 302, 306, 308 in FIG. 3A). As may be seen form FIG. 6A, additional activity information captured in between video clips (e.g., rider position shown by thin curve, e.g., segment denoted by arrow 604) may provide a fuller description of the activity. In some implementations, the metadata capture for the duration of the activity may enable determination of various statistics such as distance travel, calories burned, average cadence, elevation loss/gain, and/or other parameters. Arrows 612, 616, 618 in FIG. 6A may correspond to instances of video recording initiation, e.g., denoted 342, 346, 348 in FIG. 3A. Arrow 610 may indicate present location of the rider.

The metadata track may be stored in a session container. The term session may be used to describe data collection during an activity, e.g., navigation of the trajectory 600 of FIG. 6A during time duration 346 of FIG. 3A. In some implementations, the session container may be configured using a multimedia container format, e.g., MP4, MOV. In one or more implementations, such as shown and described in FIG. 4A, the session container may include metadata track while video and/or audio track may remain blank. The session container 400 may include metadata track 408 consisting of one or more metadata channels (e.g., channels 330, 310, 320 in FIG. 3A). The metadata track 408 may include links 410 to one or more captured content elements (e.g., video clips 302, 306 in FIG. 3A, images 342, 346 in FIG. 3B, and/or other content elements). Links 410 may contain information related to time, file name, content clip identification ID, frame position, frame time, and/or other information configured to enable a content playback application to access content element. Broken line rectangles 402, 404, 406 in FIG. 4A may denote portions of the metadata track corresponding to captured content element. In some implementations, the session container (e.g., 400 in FIG. 4) may be configured using a multimedia container format, e.g., MP4, MOV wherein video and/or audio track may remain blank.

In some implementations, a link (e.g., the link 410) may be configured using indexable unit information that may be present in a header of a video file (e.g., MOV/MP4). In one or more implementations wherein the video container may be configured using a group of pictures (GOP) compression (e.g., H.264), the indexable unit may correspond to a video frame. In some implementations the indexable unit may correspond to multiple frames and/or time slice in excess of the frame duration; the indexable unit may include a start time (in the MOV/MP4 time-base) and the time duration (time slice) that the indexable unit represents. If the time-base is configured in frames, a file with a 15-frame GOP compression, may be configured to include an entry at time 0, with length 15, entry at time 15 with length 15, entry at time 30 with length 15, and/or other entries.

Individual metadata channels of the session container (e.g., 400) may be characterized by sampling rate and/or sampling interval. In some implementations, one or more metadata channels may be stored with the respective video using, e.g., metadata storage methodology described in detail in U.S. patent application Ser. No. 14/920,427, entitled "APPARATUS AND METHODS FOR EMBEDDING METADATA INTO VIDEO STREAM" filed on 22 Oct. 2015, the foregoing being incorporated herein by reference in its entirety. Metadata information stored with the video may be characterized by a given metadata sampling rate. In some implementations, the metadata sampling rate of a given metadata source (e.g., IMU) stored with the video content may be greater than sampling rate of the metadata stored in a session container. By way of an illustration, camera motion information provided by an IMU may be acquired at 1000 Hz rate. A metadata track of a video storage container may be used to store motion information at full resolution (e.g., 1000 HZ); a session container may be configured to store a sub-sampled version of the motion information (e.g., at 10 Hz) in order to reduce container storage size and/or processing load associated with decoding and/or interpreting session container information. Storing video and metadata (e.g., camera motion information) at high resolution (e.g., comparable or greater or equal frame rate) may provide for improved image manipulation, e.g., image stitching such as described in detail in U.S. patent application Ser. No. 14/949,786 entitled "APPARATUS AND METHODS FOR IMAGE ALIGNMENT" filed on 23 Nov. 2015, rolling shutter correction e.g., image stitching such as described in detail in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, and/or other image manipulation operations. In some implementations, session container may be configured to store metadata information at the source resolution (e.g., 1000 Hz in the above example).

Figure 3B:
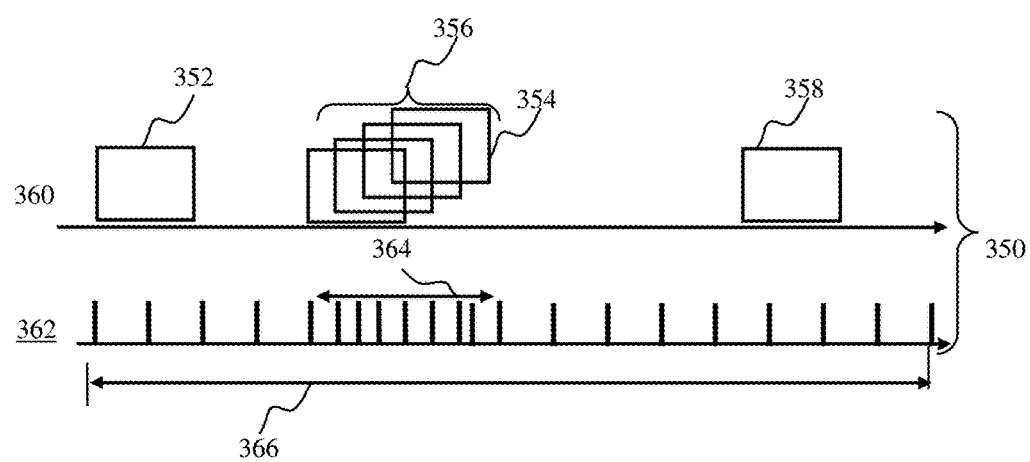
FIG. 3B is a graphical illustration depicting continuing collection of metadata contemporaneously with discontinuous image acquisition by e.g., a capture device of FIG. 1B in accordance with one implementation.

FIG. 3B illustrates continuing collection of metadata contemporaneously with discontinuous image acquisition by e.g., a capture device of FIG. 1B in accordance with one implementation. Information may include content track 360 and metadata track 362 stored in a session container 350. The timeline 360 illustrates the content track comprising content portions 352, 354, 358 or other portions captured during time interval 366. In some implementations, individual portions 352, 356, 358 may include one or more images and/or image burst (e.g., portions 356 comprised of multiple images e.g., 354). Individual portions 352, 356, 358 may be spaced form one another by time intervals. In some implementations, two or more clips may occur adjacent to one another. It will be recognized by those skilled in the arts that contend description of FIGS. 3A-3B is provided to illustrate principles of the disclosure. Various other content configurations may be utilized, e.g., audio content, content track consisting of video, photo, and photo burst portions (e.g., portions 302, 306, 308), and/or other configurations.

Metadata track 362 may include one or more metadata channels (e.g., such as 310, 320, 330 described above with respect to FIG. 3A). Metadata track 362 may include metadata information collected over time duration 366. In some implementations, sampling interval of one or more metadata channels may be adjusted based on evaluation of metadata value(s) for that channel and/or other channels. By way of an illustration, based on detection of an event by, e.g., determining that one or more metadata channel values may breach one or more thresholds (e.g., acceleration above a given value indicative of a jump, and/or tight turns), the sampling rate of one or more metadata channels may be adjusted, e.g., as shown by a decrease of the sampling interval of channel during duration denoted arrow 364. In some implementations, detection of the event may cause change in the content collection configuration, e.g., collection of a burst 356 of images.

Information of the session 350 may be stored a session container. The session container may include the metadata track 362 and the content track 360. In some implementations, the session container (e.g., 400 in FIG. 4) may be configured using a multimedia container format, e.g., MP4, MOV wherein video and/or audio track may remain blank.

Figure 4A:
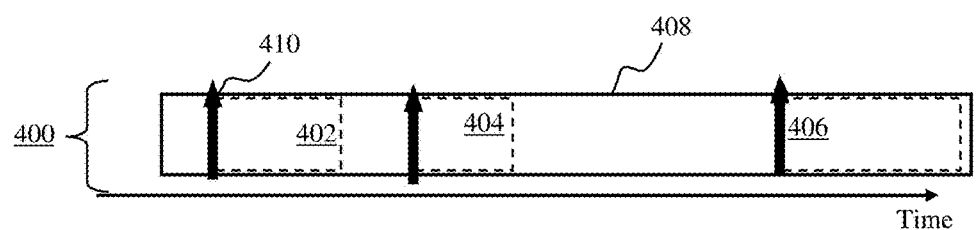
FIGS. 4A-4C illustrate session container for storing metadata in accordance with one or more implementations.
Figure 4B:
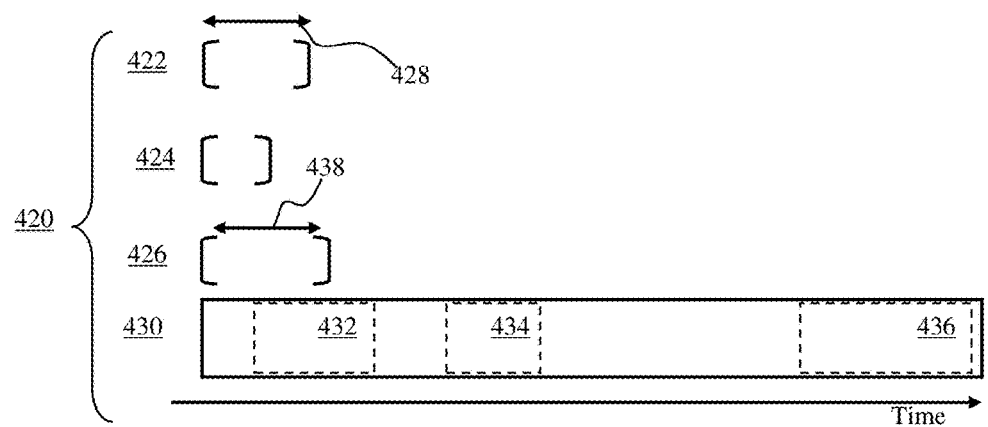
Figure 4C:
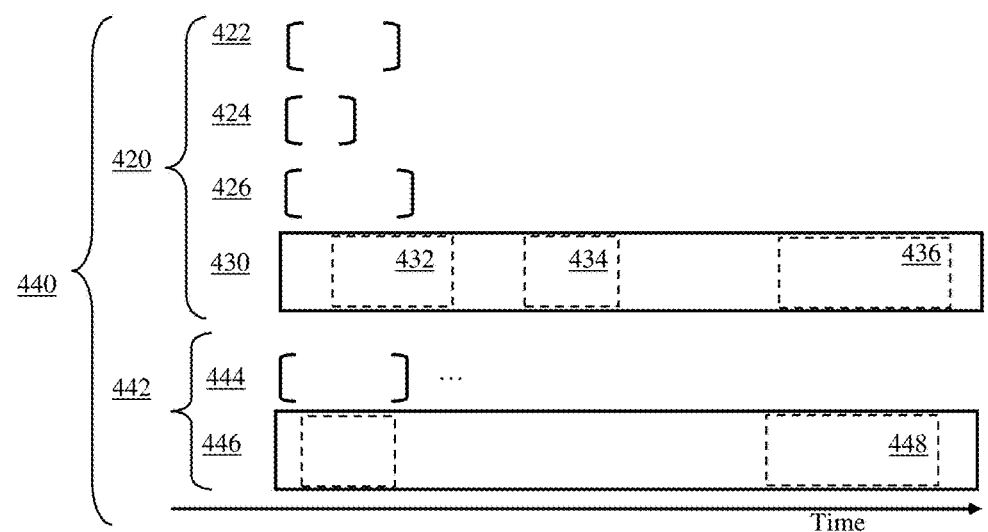

FIGS. 4B-4C illustrate session container configurations for storing metadata in accordance with one or more implementations. Session container 420 of FIG. 4B may include a metadata track 440 and multiple content elements (e.g., audio, video clips, photos, bursts of photos, and/or a combination thereof) 422, 424, 426. Individual elements 422, 424, 426 may be characterized by a duration, e.g., denoted by arrows 428, 438. Broken line rectangles 432, 434, 436 in the metadata track denote time instances and duration associated with the content clips 422, 424, 426. The session container 420 may include links configured to relate metadata track to the content clips during playback.

In some implementations the metadata session container may be configured to store multiple sessions from one or multiple cameras, e.g., such as shown and described with respect to FIG. 4C, below. Session container 440 may include the session 420 of FIG. 4B and one or more other session containers, e.g., 442 in FIG. 4C. Session containers 420, 442 may correspond to information obtained with two capture devices. Session containers 420, 442 may include metadata information 430, 446 for the duration of an activity. Session containers 420, 442 may include one or more content segments 422, 424, 426, 444. Time intervals corresponding to time when the content segments may have occurred during the activity may are denoted by broken line rectangles 432, 434, 46, 448, respectively. Some content segments may overlap in time (e.g., segments 426, 444 as indicated by rectangles 436, 448 in FIG. 4C). A session container (e.g., 420, 440) may be configured using logical links between metadata portion (430, 446) and the corresponding content portion (e.g., 422, 424, 426, 444). In some implementations a session container may be configured to appear as a single entry (e.g., a folder containing multiple elements, e.g., 430, 446, 422, 424, 426, 444) in a folder structure of an operating system. In some implementations contents of a session container may be configured to appear as multiple entries in a folder of a storage device.

Figure 4D:
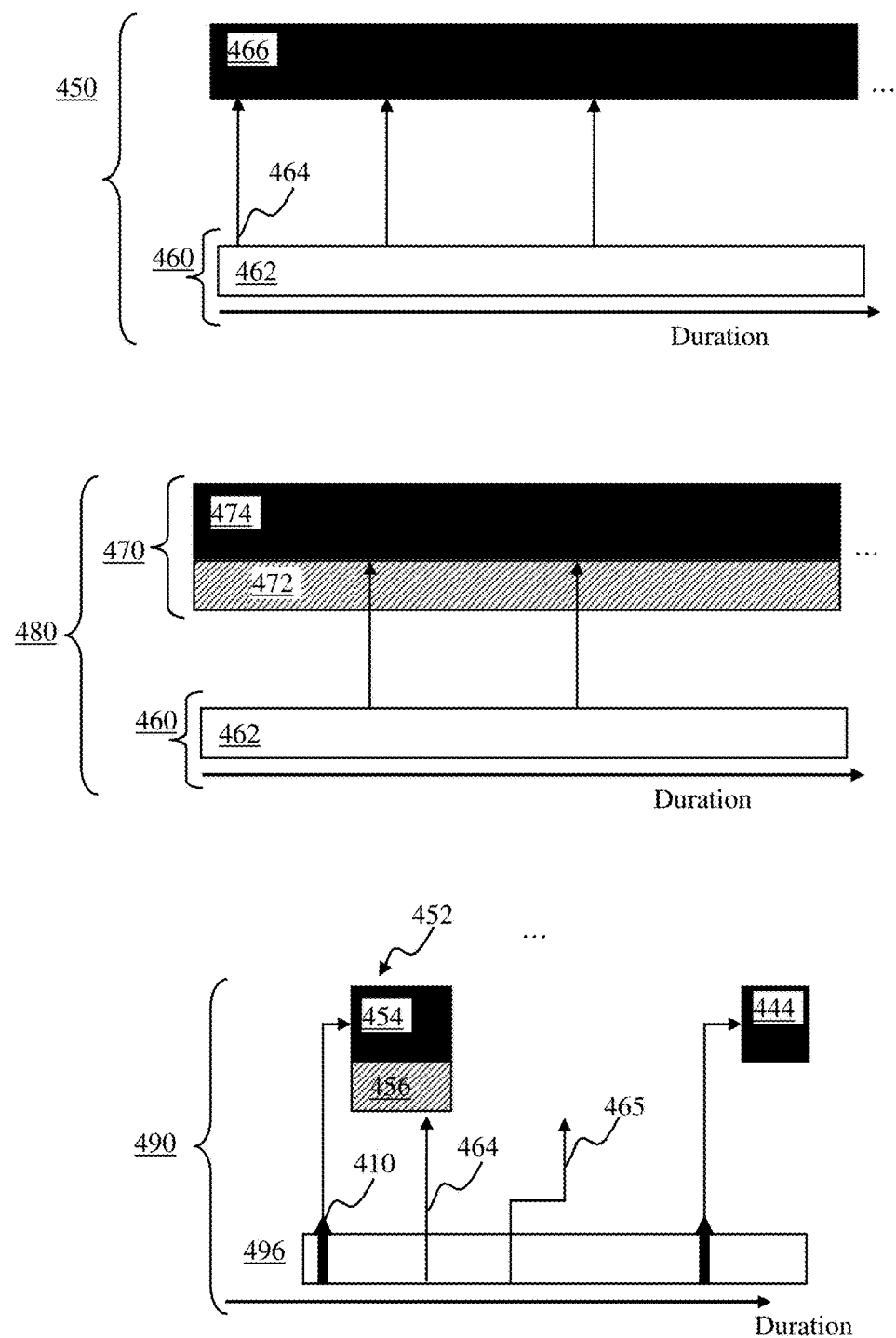
FIG. 4D illustrates use of session container for storing image and/or video content and/or content proxy in accordance with one or more implementations.

FIG. 4D illustrates a content library comprised audio, image and/or video content and/or content proxy in accordance with one or more implementations. The content library of FIG. 4D may include one or more content entries (e.g., 466), session container entries (e.g., 460, 480, 490). Content entries may include entries of imaging content (e.g., 466, 444), entries of imaging content with metadata (e.g., session 470 comprising imaging content portion 474 and metadata portion 472, entry 452 including content portion 454 and metadata portion 456), and/or other entries. Entries of FIG. 4D may be obtained using a variety of capture devices including but not limited to devices described herein (e.g., system 800 of FIG. 8, system 100 of FIG. 1A, and/or apparatus 130 of FIG. 1B. Session entries of FIG. 4D may be configured using any applicable methodologies and include metadata portion (e.g., 462, 496 for entries 460, 490, respectively), links to one or more imaging content entries/segments (e.g., shown by arrows 410 in FIG. 4D), and imaging content (e.g., 474). In some implementations, the session 458 may correspond to session 400 of FIG. 4A; session 460 may correspond to session 440 of FIG. 4C. In some implementations, wherein imaging content of library 450 may include video and/or bursts of images (e.g., time lapse) the library may effectuate substantial demands on a storage component (e.g., 816, 916 in FIGS. 8-9). By way of an illustration, typical action camera may produce video content at data rates in excess of 30-45 megabits per second (Mbits)/s so that one minute of high definition (HD) video may occupy 350 megabytes (MB) of storage. A content library (e.g., 450) of a typical user may readily exceed 100 GB of storage. Given present day wireless data communication rates (e.g., below 1000 Mbits/s) and/or storage available to mobile devices (e.g., below 100 GB), accessing one's image and/or video library using a mobile communications device (e.g., smartphone) may be cumbersome and/or of limited resolution and/or duration.

In some implementations, a session container may be configured to include a proxy information for video content. Such proxy information may enable users to browse through a library, identify moment/period of interest, and access content for the period of interest using methodology described herein. In some implementations, the content proxy may be configured based on metadata. By way of an illustration, metadata stored in the session container may include information related to user (e.g., heart rate), activity (e.g., location), and/or capture device (e.g., gain, white balance). Metadata may be utilized (as a proxy for the content associated therewith) in order to determine one or more events of interest (highlight) in the content. In one or more implementations, content proxy may be determined using the content as described in detail herein.

FIGS. 4D-5C illustrate use of session container for storing image and/or video content and/or content proxy in accordance with one or more implementations. Session container 450 of FIG. 4D may include metadata portion 462 that may include sensor information, sensor configuration, camera information, user physiological information, and/or other metadata information, e.g., such as described above with respect to records 310, 320, 330, 362 of FIGS. 3A-3B, and/or metadata information 408, 430, 446 of FIGS. 4A-4C. Session container 480 of FIG. 4D may include the container 460 and session container 470. The container 470 may include content portion 474 and metadata portion 472. In one or more implementations, the content may correspond to video content, image content (e.g., time lapse, image burst), audio, a combination thereof.

In some implementations, the metadata portion 474 (denoted by hashed rectangle) may be characterized by a greater data rate compared to the metadata portion 462, as denoted by blank rectangle. Greater data rate of one metadata record relative another record may be due to a variety of causes, e.g., greater sample rate, greater sample bit depth, greater number of channel, and/or other causes. By way of a non-limiting illustration, metadata portion 472 may comprise sensor motion information (e.g., orientation) obtained at a greater rate (e.g., 1000 Hz or greater) compared to motion information that may be stored in the metadata portion 462 (e.g., at 10 Hz or lower). Lower data rate of the metadata 462 may result in smaller storage resource requirement of the container 460 compared to storage requirements of container 470 and/or content portion 466. For example, 16-bit samples acquired at 10 Hz may correspond to data rate of about 72 kilobytes per hour KB/h; 16-bit samples acquired at 1000 Hz may correspond to data rate of about 7.2 megabytes (MB) per hour (MB/h); high definition video may be characterized by data rate (e.g., 32 Mbit/s or about 20 gigabytes per hour (GB/h)). Using lower data rate metadata may enable a storage device to include content for a greater time duration compared to the same storage device housing video content.

Figure 8:
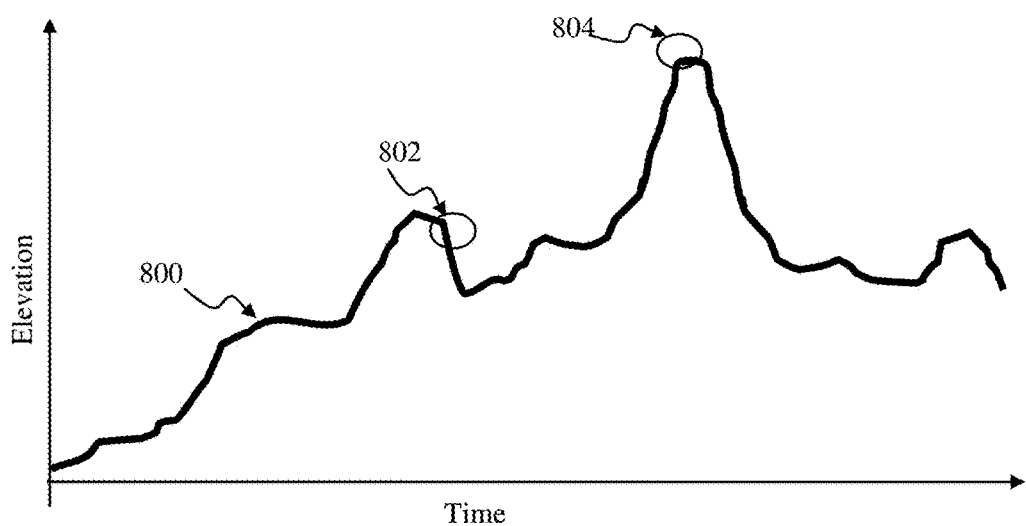
FIG. 8 is a plot presenting camera elevation data obtained from a session container for highlight determination, in accordance with one implementation.

Metadata information that may be stored in the session container (e.g., metadata portion 462) may be utilized to determine a moment of interest (highlight) in content associated therewith. FIG. 8 presents exemplary sensor information useful for determining content highlights. By way of a non-limiting illustration, elevation data (shown by curve 800 FIG. 8 may be analyzed in order to determine one or more events (e.g., 802, 804) that may correspond to a highlight in the content. Events 802, 804 may be determined using a variety of characteristics, e.g., absolute value breaching a threshold, rate of change, and/or other criteria. The session container may be configured to store timing information associated with metadata and the content. In one or more implementations, the timing information may include a time stamp, frame rate, frame number, metadata sample rate, a sample number information, a real time clock output, and/or other information. Combining occurrence of one or more events (e.g., 802, 804) and the timing information, pointer(s) to one more highlights in the content may be determined. Thin line arrows 464 in FIG. 4D denote the highlight pointers determined using the metadata proxy of the content.

Session container (e.g., 490) may include one or more links 410 to imaging content portions (e.g., portion 444 described with respect to FIG. 4C) and/or content library entry 452. The content entry 452 may include content portion 454 and metadata portion 456 containing e.g., sensor motion information at a greater sample rate compared to information stored in the metadata portion 496. In some implementations, duration of higher data rate video/image content (e.g., combined duration of portions 444, 454 in FIG. 4D) may be configured 25% or less the total duration of the activity (e.g., the duration of the metadata track 496).

Figure 5A:
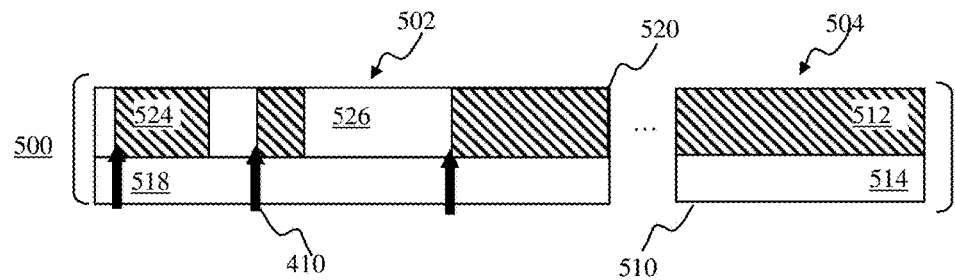
FIGS. 5A-5C illustrate session container configurations for providing content proxy in a content library content in accordance with one or more implementations.
Figure 5B:
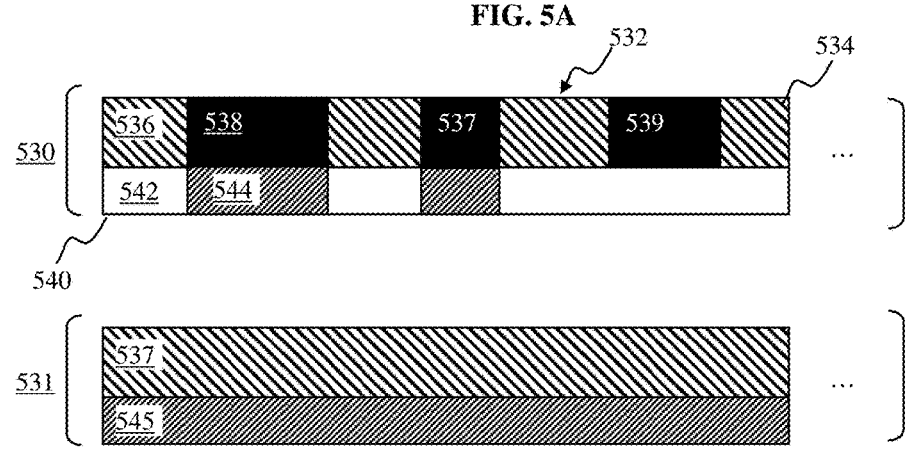
Figure 5C:
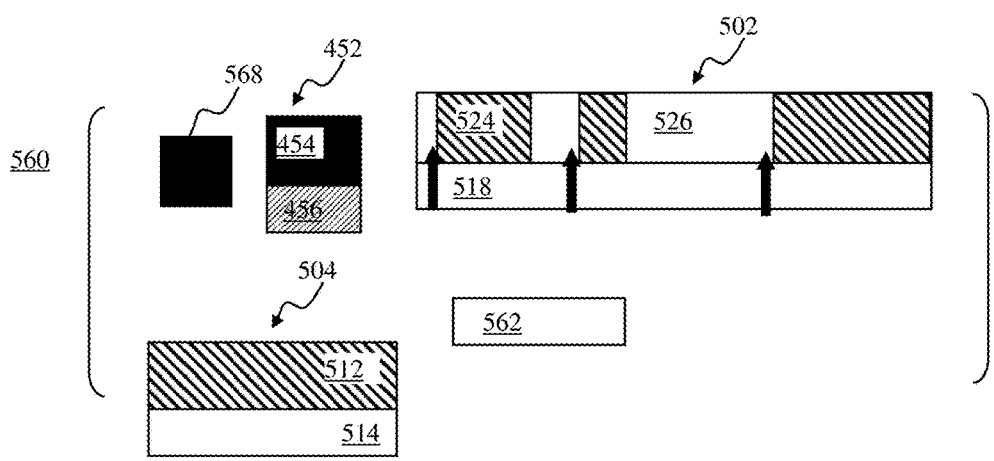

FIGS. 5A-5C illustrate use of session container for storing image and/or video content and/or content proxy in a content library in accordance with one or more implementations. Content library 500 of FIG. 5A may include one or more session containers 502, 504. Individual session containers may include metadata portion (e.g., 518, 510) configured to provide proxy information for associated content. In some implementations, the metadata portion (e.g., 518) may consist of lower data rate (e.g., lower-resolution) metadata information compared to metadata that may be available during content collection. As described above, metadata may be down sampled (e.g., in time and/or in bit depth) for the purposes of obtaining content proxy so as to reduce proxy storage and/or transmission resource requirement. By way of an illustration, position data may be stored in a proxy at 1 s intervals, motion data may be stored at 10 times/second to 1 time per second. The metadata track may include links 410 to one or more content segments corresponding to the metadata. In some implementations, the metadata track 518 of FIG. 5 may correspond to metadata track 430 of FIG. 4B. Links 410 of the metadata track 430 of FIG. 4B may point to content elements 422, 424, 426 of FIG. 4B.

Metadata stored in containers 502, 508 may be used to obtain proxy information for respective imaging content (not shown in FIG. 5A). In some implementations, the container 502 504 may be configured using multimedia container format (e.g., MP4, MOV, and/or other format). Containers 502, 504 may include content track 520, 512 (video track in some implementations). Content track information may correspond to imaging/video content (not shown) that may be stored elsewhere. In some implementations, the content track may include information (show by bold hashed rectangles 524, 512 in FIG. 5A) related to video and/or image content. The information related to the content may be referred to as the content proxy. In one or more implementations, the content proxy 524, 512 may include down sampled version of the content. By way of an illustration, for a video content acquired at 30 fps at 1920 pixel by 1080 pixel resolution, the content proxy 524 may include image thumbnails with resolution 215 pixels by 120 pixels updated at once per second (1 fps). Such configuration may be configured to produce data rate reduction of about 2500 times. It will be with recognized by those skilled in the arts that above values are exemplary and serve to illustrate methodology of the disclosure. Various update rates (e.g., 2 fps, 0.25 fps) and/or image thumbnail resolution (e.g., 160 pixel×120 pixel, 280 pixel×160 pixel) may be utilized to obtain content image proxy information.

Metadata and/or proxy information of a session container data rate may be based on a pre-configured session container storage threshold parameter. In some implementation, the threshold parameter may correspond to a fraction (e.g., 0.001% to 25%), of the video content data rate, content acquisition system storage capacity (e.g., SD card capacity), data throughput of a wireless link, and/or other parameter. By way of an illustration, imaging proxy threshold may be configured to correspond to 1% of the video content data rate; for HD imaging content acquired at 30 Mbit/s the imaging proxy may be configured at 0.3 Mbit/s. In some implementations, configuring session container threshold may cause reduction of data rate for the metadata portion of the session container (e.g., 518 of FIG. 5B) compared to data rate of other session configurations (e.g., 545 in FIG. 5B). By way of an illustration, data rate of a high resolution motion sensor (e.g., 6-degree of freedom IMU samples at 1000 Hz) may be reduced to two components (magnitude of acceleration and magnitude of angle of rate or rotation) stored at a reduced rate (e.g., once per second) in order to attain metadata size of 0.02% of the video data rate.

In some implementations, the content track may include portions that may not include content image proxy information (e.g., portion 526 of the content track 520 in FIG. 5A). Session container 504 configuration may provide imaging proxy for the duration of the activity used to acquire the container 504 information.

In some implementations the content library may include one or more session containers configured to store imaging content in the content track. The library 530 of FIG. 5B may include session container 532 that may include image content elements denoted by solid rectangles (e.g. 538) and content image proxy track may include portions that may not include content image proxy shown by hashed rectangles (e.g., 536) in the content track 534. As used in FIGS. 4D-5C, black filled rectangles may denote data at data rates greater than bold hashed rectangles. The corresponding metadata track 540 of the container 532 may include lower data rate portions (shown by open rectangles e.g., 542) and higher data rate portions (e.g., shown by thin hashed rectangles e.g., 544).

In one or more implementations, a portion of the metadata track may include information stored at data rate that may be greater compared to other portion of the metadata track (e.g., portion 544 shown by hashed rectangle of the metadata track 540 may be characterized by greater data rate compared to portions (e.g., 544) of the metadata track 540 shown by open rectangles. By way of an illustration, metadata track 540 configuration may be used, e.g., for providing information for content manipulation (e.g., rolling shutter correction) of the corresponding imaging content (538). As used in FIGS. 4D-5C, when describing metadata, open filled rectangles may denote information stored at data rates that may be lower compared to hashed rectangles.

In some implementations, a capture system may include multiple capture device (e.g., 110 of FIG. 1A, 130 of FIG. 1B). One or more capture device (hereinafter capture device (s) A) may be configured to capture video, images, and/or metadata to obtain, e.g., storage container including video only (e.g., video track 466 of FIG. 4D), session container configuration including such as 450, 480, 442 of FIG. 4D, and/or other configuration including high data rate video and/or image content. One or more capture devices (hereinafter capture device(s) B) may be configured to capture metadata and/or video and/or image content to produce session container 531 of FIG. 5B including metadata track 545 and imaging proxy. The imaging proxy 537 of session 531 may be characterized by a lower data rate (e.g. image thumbnails, lower frame rate video, and/or combination thereof) compared to video image information (e.g., 466 of FIG. 4D) acquired by the capture device(s) A. Metadata 545 and/or imaging proxy 537 may be utilized to obtain links to portions of higher data rate video/image content of the track 466 using any applicable methodologies including these described herein.

FIG. 5C illustrates a content library comprising various elements including, e.g., session containers 502, 504 of FIG. 5A containing imaging proxy and metadata proxy, content portion 452 of FIG. 4D, session container 562 containing the metadata proxy, content element 568 and/or other entries. It will be appreciated by those skilled in the arts that library and/or session container configurations shown herein are exemplary and serve to illustrate principles of the disclosure. Various other session container configurations may be used including, e.g., blank content track, content track containing images and/or video content, content track containing image proxy and/or other content track configurations; metadata track may be configured to include lower resolution (subsampled) metadata, higher resolution metadata, links to content, and/or combination thereof. Content library (e.g., such as shown and described herein) may be stored at a variety of destinations including, e.g., capture device (e.g., 110 in FIG. 1A), remote device (e.g., 120 in FIG. 1A), a server, a cloud depository, a smart watch, and/or other destination.

Figure 1C:
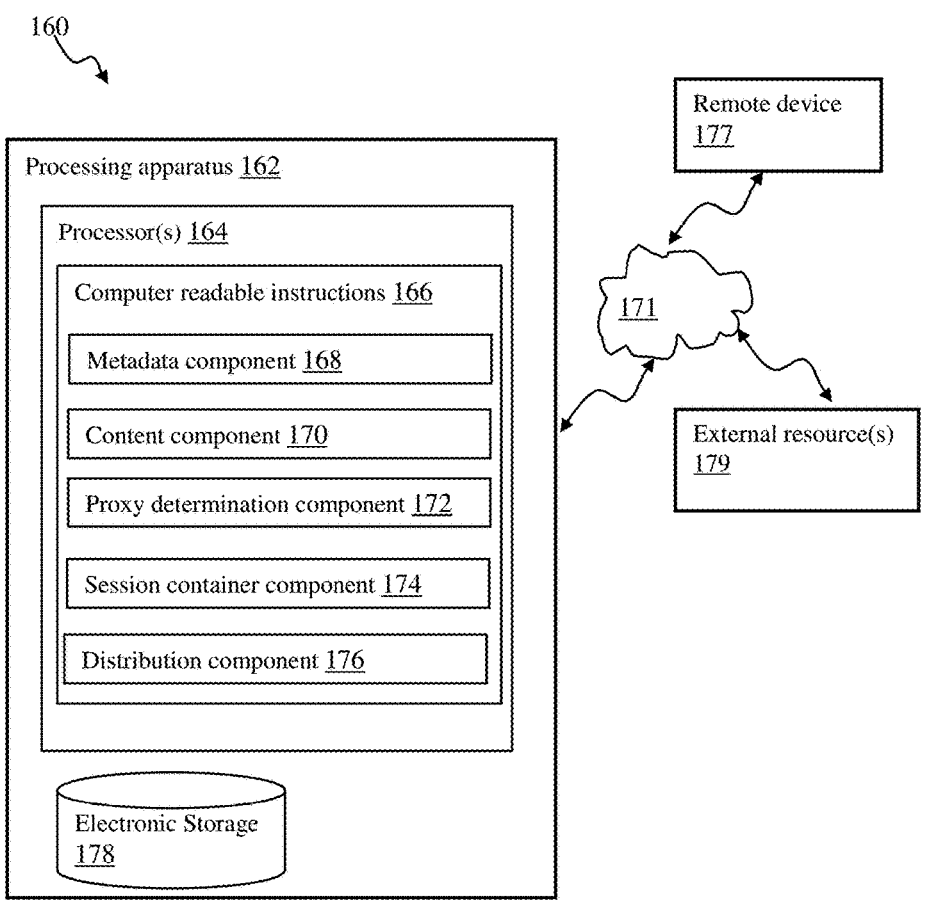
FIG. 1C is a functional block diagram illustrating a system for obtaining a content proxy in accordance with one implementation.

FIG. 1C illustrates a computerized system for obtaining content proxy in accordance with one implementation. In some implementations, the system 160 may be configured to obtain the content proxy during content acquisition by a capture device. In one or more implementations, the system 160 may be configured to obtain the content proxy using previously acquired content.

The system 160 of FIG. 1C may include a processing apparatus 162 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The apparatus 162 may be in operable communication with a remote device 177 via one or more electronic communications interface 171. The interface 171 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 171 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 171 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 160 may use custom and/or dedicated data communications technologies instead of, or in addition to, the ones described above.

The remote device 177 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), a metadata source (e.g., device 124, 122 of FIG. 1A, 152 of FIG. 1B, a navigation device (e.g., a GPS receiver, a GPS base station), a device configured to communicate information related to environment of the system 160, e.g., heart rate of a user, environmental conditions, position information and/or or other information), and/or device configured to communicate information with the apparatus 162. In some implementations, the system 160 may include multiple capture devices 162, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, the foregoing being incorporated herein by reference in its entirety.

The apparatus 162 may include one or more physical processors 164 configured by machine-readable instructions 166 and/or other components. Executing the machine-readable instructions 166 may cause the one or more physical processors 164 to facilitate content proxy determination and session container provision. The machine-readable instructions 166 may include one or more of a metadata component 168, image/audio component 170, a proxy determination component 172, a session container component 172, a distribution component 174, and/or other components.

One or more features and/or functions of the apparatus 162 may be facilitation of video content acquisition, generation and/or provision of content proxy. It is noted that although the present disclosure is directed to videos and/or video clips, one or more other implementations of system 160 and/or apparatus 162 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 162 may include electronic storage 178. The apparatus 162 may include communication lines or ports to enable the exchange of information with a network and/or other entities. Illustration of apparatus 162 in FIG. 1C is not intended to be limiting. The apparatus 162 may include a plurality of hardware, software, and/or firmware components operating together to provide the functionality attributed herein to apparatus 162. For example, the apparatus 162 may be implemented by a cloud of computing platforms operating together as apparatus 162.

Electronic storage 178 may comprise electronic storage media that electronically stores information. The electronic storage media of electronic storage 178 may include one or both of system storage that is provided integrally (i.e., substantially non-removable) with apparatus 162 and/or removable storage that is removably connectable to apparatus 162 via, for example, a port or a drive. A port may include a USB port, a Firewire port, and/or other port. A drive may include a disk drive and/or other drive. Electronic storage 178 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 178 may include one or more virtual storage resources (e.g., cloud storage, a virtual private network, and/or other virtual storage resources). The electronic storage 178 may be configured to store software algorithms, information determined by processor(s) 164, information received from apparatus 162, information received from external resource(s) 179, and/or other information that enables apparatus 162 to function as described herein.

The system 160 may include an external resource(s) operatively linked via one or more electronic communication links 171. External resource(s) 179 may include sources of information, hosts, and/or other entities outside of system 160, external entities participating with system 160, computing platforms, and/or other resources. In some implementations, some or all of the functionality attributed herein to external resources 179 may be provided by resources included in system 160.

It will be appreciated that this is not intended to be limiting and that the scope of this disclosure includes implementations in which apparatus 162, external resources 179, and/or other entities may be operatively linked via some other communication media.

Processor(s) 164 may be configured to provide information-processing capabilities in apparatus 162. As such, processor 164 may include one or more of a digital processor, an analog processor, a digital circuit designed to process information, an analog circuit designed to process information, a state machine, and/or other mechanisms for electronically processing information. Although processor 164 is shown in FIG. 1C as a single entity, this is for illustrative purposes only. In some implementations, processor 164 may include one or more processing units. These processing units may be physically located within the same device, or processor 164 may represent processing functionality of a plurality of devices operating in coordination. The processor 164 may be configured to execute components 168, 170, 172, 174, and/or 176. Processor 164 may be configured to execute components 168, 170, 172, 174, and/or 176 by software; hardware; firmware; some combination of software, hardware, and/or firmware; and/or other mechanisms for configuring processing capabilities on processor 164.

It should be appreciated that although components 168, 170, 172, 174, and/or 176 are illustrated in FIG. 1C as being co-located within a single processing unit, in implementations in which processor 164 includes multiple processing units, one or more of components 168, 170, 172, 174, and/or 176 may be located remotely from the other components. The description of the functionality provided by the different components 168, 170, 172, 174, and/or 176 described above is for illustrative purposes and is not intended to be limiting, as any of components 168, 170, 172, 174, and/or 176 may provide more or less functionality than is described. For example, one or more of components 168, 170, 172, 174, and/or 176 may be eliminated, and some or all of its functionality may be provided by other ones of components 168, 170, 172, 174, and/or 176 and/or other components. As an example, processor 164 may be configured to execute one or more additional components that may perform some or all of the functionality attributed below to one of components 168, 170, 172, 174, and/or 176.

In FIG. 1C, the metadata component 168 may be configured to access and/or manage metadata. In some implementations, the metadata component may obtain metadata from one or more metadata sources (e.g., 126, 122, 120, 144, 152 described with respect to FIGS. 1A-1B), and/or other sources. In some implementations, the metadata component may obtain metadata from electronic storage 178 and/or external resource 179 (e.g., external storage). The metadata operations performed by the component 168 may include information timestamping, resampling (e.g., sub-sampling in time and/or in bit depth), channel concatenation, unit conversion, determination of additional (derived) metadata (e.g., determining speed from acceleration, distance travel from speed) and/or other operations.

The image/audio component 170 may be configured to access and/or manage image and/or audio content. In some implementations, the component 170 may be configured to effectuate image/audio content acquisition using any applicable methodologies including those described herein. By way of an illustration, the component 170 may be operable to instantiate content acquisition by the capture device 110 based on a timer event, user instruction, or a sensor event. In some implementations, the component 170 may be operable to access previously acquired content from electronic storage 178 and/or external resource 179 (e.g., external storage). The operations performed by the image/audio content component 170 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, the foregoing being incorporated herein by reference in its entirety, and/or in a session container (e.g., 450 of FIG. 4D).

The proxy component 172 may be configured to obtain proxy information associated with the content. In some implementations, the proxy information may include metadata, provided by one or more metadata sources, e.g. such as described with respect to FIGS. 1A-1B. In some implementations, the proxy may be obtained by downsampling the metadata (e.g., to reduce sample rate, number of channels (sensor streams), and/or data bit depth). In one or more implementations, the content proxy may be obtained based on a lower data rate (downsampled) version of the content. By way of an illustration, the image content based proxy may include multiple thumbnail images of smaller pixel size stored at a lower frame rate (greater interval) compared to the source video content, e.g., such as described in detail with respect to FIGS. 5A-5B. The content proxy information may be configured into a session container format, e.g., MOV, MP4 in some implementations.

The distribution component 174 may be configured to provide the content proxy information and/or links to the corresponding content. The proxy provision may include storing the proxy information (e.g., session container) on the storage component 178, updating storage component directory listing to reflect the stored proxy information, communicating the proxy information to an external entity (e.g., the remote device 177 (e.g., smartphone) and/or external resource 179 (e.g., cloud storage)), and/or other operations.

One or more session containers containing content proxy may be utilized in order to access content from, e.g., a resource restricted device e.g., mobile phone, smartphone, tablet computer, laptop computer, and/or other device. Typically smartphone devices may have limited internal storage, limited wireless data communication rate, and/or data communication amount limitations. It may be cumbersome and/or altogether not feasible to access a large library of content (e.g., in excess of 100 GB) from a resource restricted device. Content access using present solutions, may be typically limited to a subset of the library (e.g., short (0.25 min to 5 min in duration) episodes (highlights) that have been previously created.

Figure 1D:
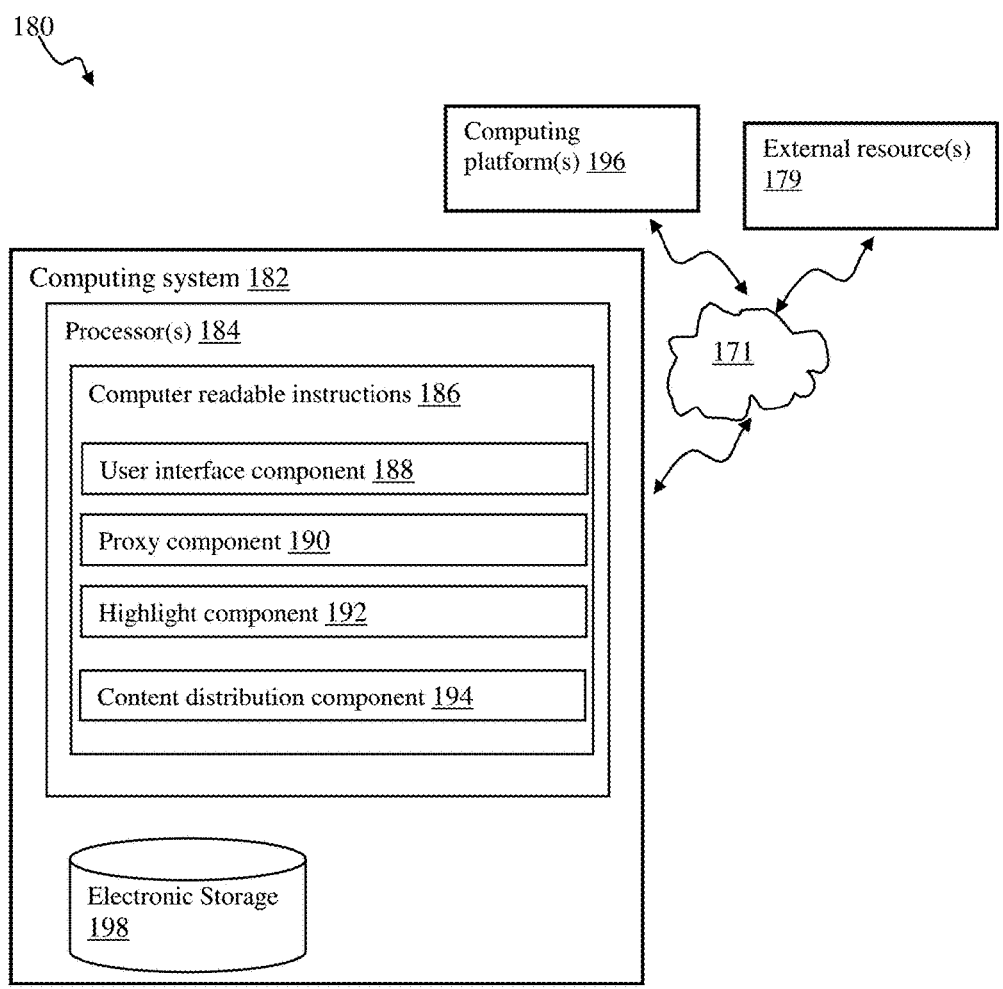
FIG. 1D is a functional block diagram illustrating a system for providing content using content proxy of a session container in accordance with one implementation.

FIG. 1D illustrates a system for providing content using content proxy in accordance with one implementation.

In some implementations, the system 180 of FIG. 1D may be configured to provide content acquired by a capture device (e.g., an action camera such as described with respect to FIG. 1A) based on previously obtained content proxy information.

The system 180 of FIG. 1D may include a computing system 182 (e.g., such as a e.g., smartphone, a digital camera, a laptop, a tablet computer, a desktop computer, a television set-top box, smart TV, a gaming console, a client computing platform, a server, and/or other apparatus.

The system 182 may be in operable communication with an external computing platform 196 one or more electronic communications interface 171. The interface 171 may include one or more wired interfaces (e.g., serial, USB, Thunderbolt™, HDMI, Ethernet, and/or other wired interfaces) and/or more wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 171 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 171 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 180 may use custom and/or dedicated data communications technologies instead of, or in addition to, the ones described above.

The external computing platform 196 may include e.g., smartphone, a laptop computer, a tablet computer, a desktop computer, a television set-top box, smart TV, a gaming console, a client computing platform, a server, a cloud computing service operable by one or The system 182 may include one or more physical processors 184 configured by machine-readable instructions 186 and/or other components. Executing the machine-readable instructions 186 may cause the one or more physical processors 184 to facilitate content provision based on content proxy information. The machine-readable instructions 186 may include one or more of a user interface (UI) component 188, proxy component 190, a highlight component 192, a content distribution component 194, and/or other components.

One or more features and/or functions of the system 182 may be facilitation of video content provision using video content proxy information stored in, e.g., session container. It is noted that although the present disclosure is directed to videos and/or video clips, one or more other implementations of system 180 and/or system 182 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The system 182 may include electronic storage 198. The system 182 may include communication lines or ports to enable the exchange of information with a network and/or other entities. Illustration of system 182 in FIG. 1D is not intended to be limiting. The system 182 may include a plurality of hardware, software, and/or firmware components operating together to provide the functionality attributed herein to system 182. For example, the system 182 may be implemented by a cloud of computing platforms operating together as system 182.

Electronic storage 198 may comprise electronic storage media that electronically stores information. The electronic storage media of electronic storage 198 may include one or both of system storage that is provided integrally (i.e., substantially non-removable) with system 182 and/or removable storage that is removably connectable to system 182 via, for example, a port or a drive. A port may include a USB port, a Firewire port, and/or other port. A drive may include a disk drive and/or other drive. Electronic storage 198 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 198 may include one or more virtual storage resources (e.g., cloud storage, a virtual private network, and/or other virtual storage resources). The electronic storage 198 may be configured to store software algorithms, information determined by processor(s) 184, information received from system 182, information received from external resource(s) 179 and/or computing platform(s) 196, and/or other information that enables system 182 to function as described herein.

The system 180 may include an external resource(s) 179 operatively linked via one or more electronic communication links 171. External resource(s) 179 may include sources of information, hosts, and/or other entities outside of system 180, external entities participating with system 180, computing platforms, and/or other resources. In some implementations, some or all of the functionality attributed herein to external resources 179 may be provided by resources included in system 180.

It will be appreciated that this is not intended to be limiting and that the scope of this disclosure includes implementations in which system 182, external resources 179, and/or other entities may be operatively linked via some other communication media.

Processor(s) 184 may be configured to provide information-processing capabilities in system 182. As such, processor 184 may include one or more of a digital processor, an analog processor, a digital circuit designed to process information, an analog circuit designed to process information, a state machine, and/or other mechanisms for electronically processing information. Although processor 184 is shown in FIG. 1D as a single entity, this is for illustrative purposes only. In some implementations, processor 184 may include one or more processing units. These processing units may be physically located within the same device, or processor 184 may represent processing functionality of a plurality of devices operating in coordination. The processor 184 may be configured to execute components 188, 190, 192, and/or 194. Processor 184 may be configured to execute components 188, 190, 192, and/or 194 by software; hardware; firmware; some combination of software, hardware, and/or firmware; and/or other mechanisms for configuring processing capabilities on processor 184.

It should be appreciated that although components 188, 190, 192, and/or 194 are illustrated in FIG. 1D as being co-located within a single processing unit, in implementations in which processor 184 includes multiple processing units, one or more of components 188, 190, 192, and/or 194 may be located remotely from the other components. The description of the functionality provided by the different 188, 190, 192, and/or 194 described above is for illustrative purposes and is not intended to be limiting, as any of components 188, 190, 192, and/or 194 may provide more or less functionality than is described. For example, one or more of components 188, 190, 192, and/or 194 may be eliminated, and some or all of its functionality may be provided by other ones of components 188, 190, 192, and/or 194 and/or other components. As an example, processor 184 may be configured to execute one or more additional components that may perform some or all of the functionality attributed below to one of components 188, 190, 192, and/or 194.

In FIG. 1D, the UI component 188 may be configured to obtain one or more user indications and/or to display information related to content and/or content proxy. In one or more implementations, the component 188 may include a display (e.g., display only or touch-enabled display), a keyboard, a mouse, a microphone, a speaker, a stylus pen, and/or practically any device configured to communicate information to/from a user. By way of an illustration, the component 188 may be configured to communicate to the processor 184 a content proxy selection from a user.

The proxy component 190 may be configured to access and/or analyze content proxy. In some implementations, the proxy component may be configured to obtain content proxy from a storage element based on the selection from a user. As described herein, the proxy information may include metadata (e.g., sensor) information and/or image information. In some implementations, the proxy component 190 may access metadata from electronic storage 198 and/or external resource 179 (e.g., external storage).

The highlight component 192 may be configured to obtain an indication of a moment of interested for the content associated with the content proxy information. The highlight component may be configured to present to a user metadata and/or image proxy information as, e.g., a timeline, enable scrubbing through the proxy timeline, receive one or more indications of a moment of interest from the user; receive timing information related to the moment of interest (e.g., pre time interval prior to the moment of interest and/or port time interval subsequent to the moment of interest; store the moment of interest indication and/or time interval information. The pre/post time intervals may be configured to provide time duration for displaying content portion associated with the moment of interest. By way of an illustration, a user may scrub through a timeline of image thumbnails, camera elevation time series, and/or motion information time series, identify a moment of interest (e.g., highest elevation, scene change during an activity using a keyboard, mouse, touchscreen, voice command, and/or other method. The user may configure the highlight component to display a given duration (e.g., 3 seconds) of video prior to the highlight time of occurrence and a given duration (e.g., 12 seconds) subsequent to the highlight event. In some implementations, highlight determination may be performed automatically by the processor(s) 184 using any applicable methodologies, e.g., time series analysis, statistical analysis, machine learning, computerized neural networks, and/or other approaches. The highlight indication (e.g., highlight pointer 464 in FIG. 4D) may include referencing information (e.g., related to the respective high resolution content (e.g., imaging content 466, 474 in FIG. 4D). The referencing information may include storage container name, location (e.g., file name, folder name), timing information (e.g., relative, absolute, time, frame number) and/or other information.

In one or more implementation, wherein the computing system 182 may correspond to a client computing platform (e.g., a capture device, e.g., 130 of FIG. 1B, smartphone, tablet, laptop computer, home media center, and/or other client computing platform), one or more of components 190, 192 may be executed locally by the client computing platform. In some implementation, wherein the computing system 182 may correspond to a remote computing platform, (e.g., a cloud computing service, an internet portal, a server, and/or other computing platform), one or more of components 190, 192 may be executed on a remote computing platform.

Figure 7A:
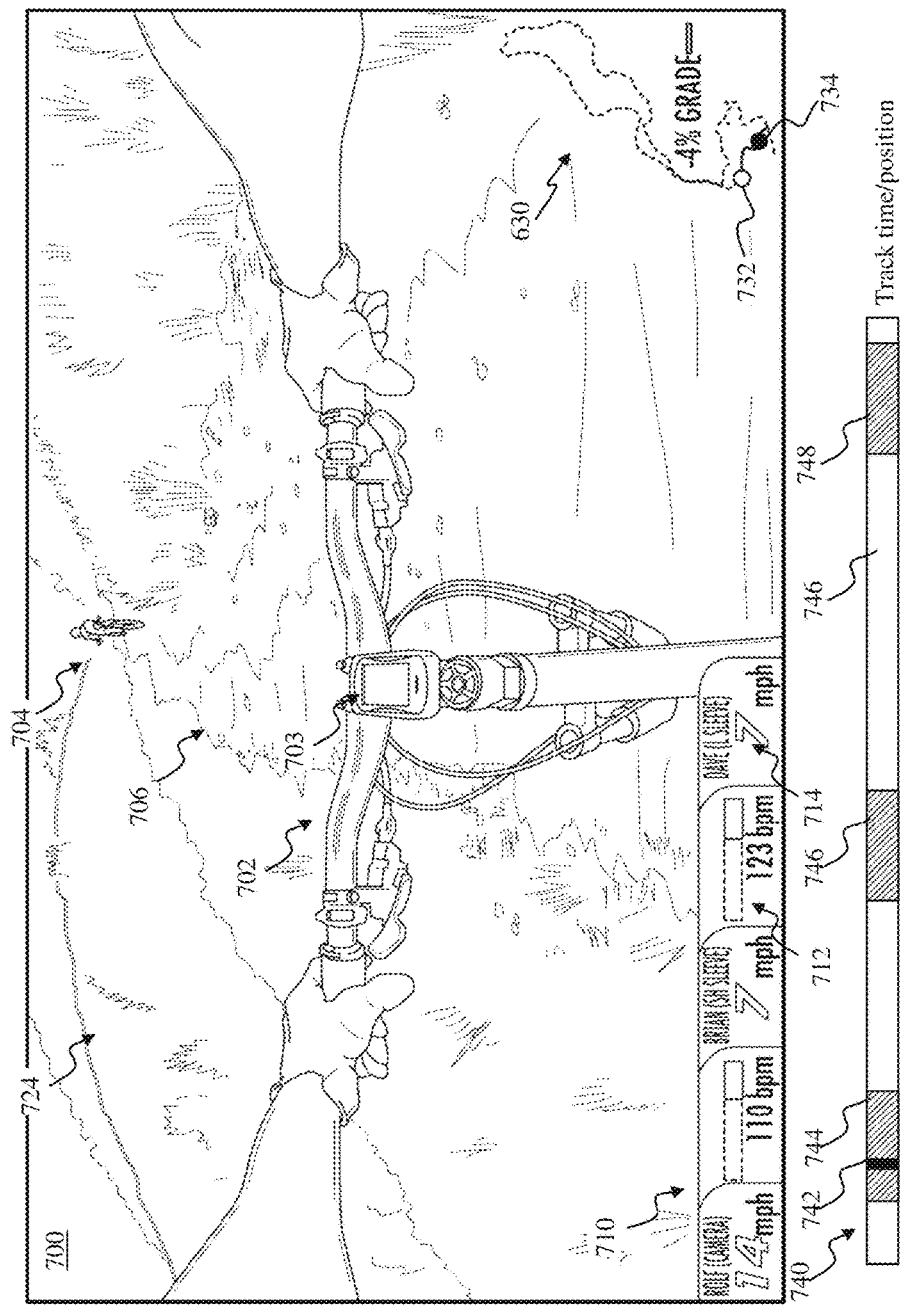
FIGS. 7A-7B present exemplary content and metadata displays useful for displaying contents of session container in accordance with some implementations.
Figure 7B:
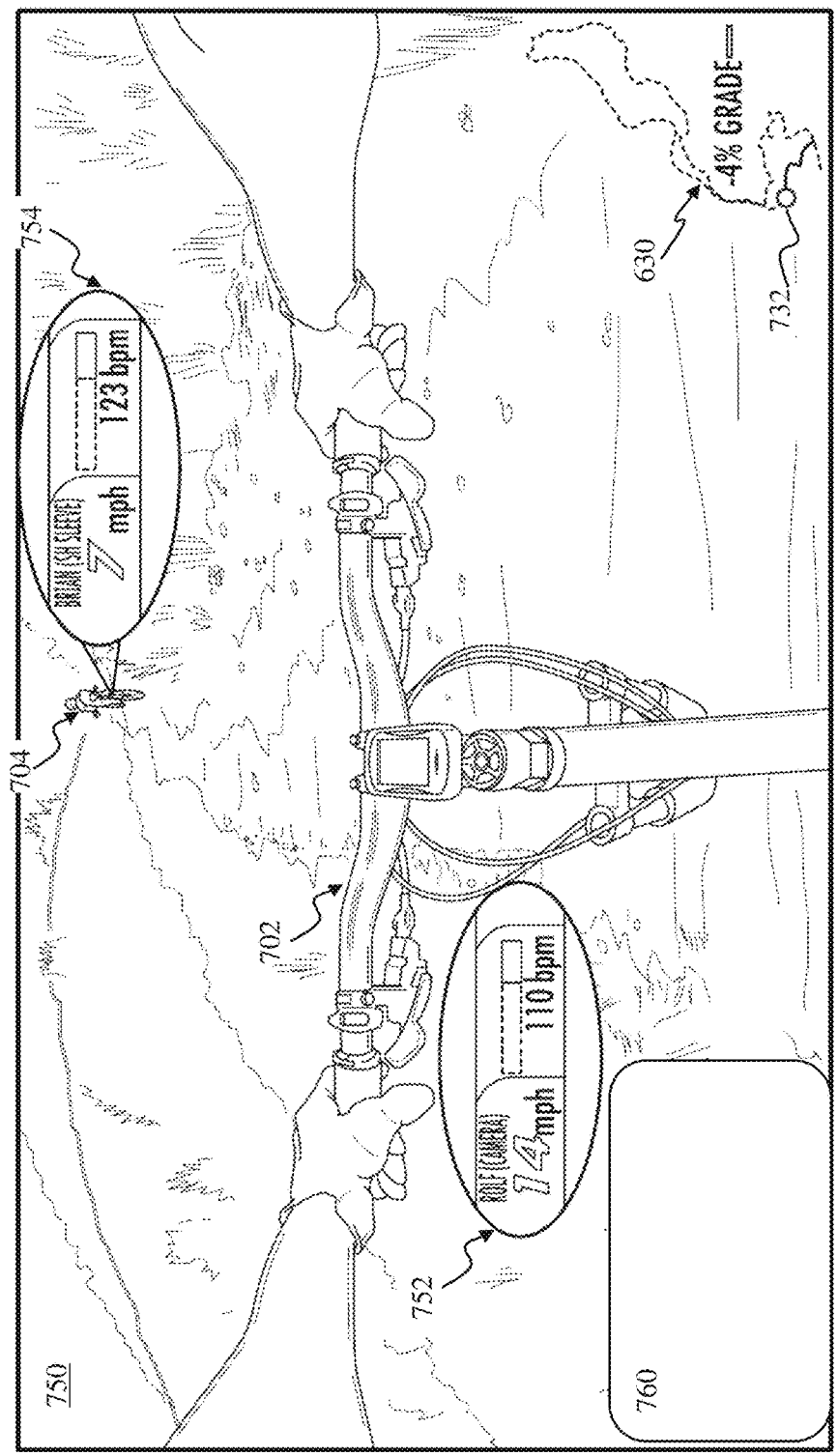

In some implementations, a highlight may be obtained based on analysis of metadata information from a distant metadata source, e.g., such as described with respect to FIGS. 7A-7B. By way of an illustration, system 180 of rider 702 of FIG. 7A may receive metadata information (e.g., such as similar to the metadata track 496 shown in FIG. 4D and described herein) of from content acquisition system of rider 704 of FIG. 7A (also referred to as the distant content acquisition system). Such metadata track may be referred to as distant metadata. The system 180 of rider 702 may be configured to analyze the distant metadata track to obtain one or more highlights (e.g., 464, 465 in FIG. 4D). The analysis may include any applicable operations including those described herein, e.g., motion analysis, position, heart rate, and/or other parameters associated with the metadata information provided by the distant capture system. In some implementation, a highlight (e.g., 465 in FIG. 4D) may correspond to content (e.g., video, image) that may be available to the distant content acquisition system.

The content distribution component 194 may be configured to provide high resolution content corresponding to the moment of interest determined from the content proxy. By way of an illustration, the highlight component 192 may produce a highlight pointer to the content (e.g., 464 to content 474 in FIG. 4D). The content distribution component 194 of FIG. 1D may receive the pointer 464, the timing information and access portion of the content corresponding to the highlight (e.g., 15-second video clip). In some implementations, the component 194 may be configured to display the content portion on a display (e.g., UI component 188). In one or more implementations, the component 194 may be configured to communicate the content portion to a target entity (e.g., upload to a cloud storage entity for sharing).

In some implementation, a wherein a highlight (e.g., 465 in FIG. 4D) may correspond to content (e.g., video, image) that may be associated with to another session container and/or another device (e.g., distant content), the content distribution component 194 may provide a link to the distant content and/or a request provision of the distant content.

Methodology for storing metadata in a session container and/or obtaining content proxy described herein may enable users to scan through the available (e.g., raw) content, identify moments of interest, access and view the corresponding content, and/or share content. By way of an illustration, a user of a smartphone may access the lower data rate content proxy (including e.g., camera motion information) for a duration of an event; identify moment of extreme motion (e.g., acceleration breaching threshold, elevation breaching threshold), and requesting portion of the content for an interval (e.g., 5 seconds to 60 seconds) shorter than the event duration (e.g., 0.5 hours to multiple hours).

Figure 6B:
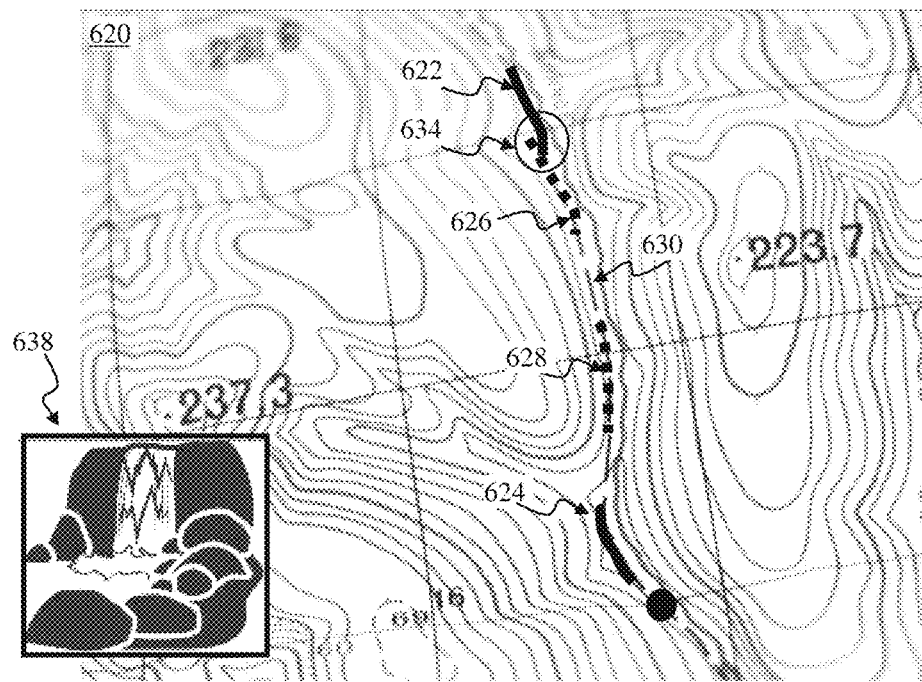
FIG. 6B illustrates use of session container information for multicamera content synchronization, sharing and/or display in accordance with one implementation.

In some implementations, the content proxy methodology described herein may enable multicamera content synchronization, sharing, and/or display. FIG. 6B illustrates use of session container information for multicamera content synchronization, sharing, and/or display in accordance with one implementation. By way of a non-limiting example, two or more users may navigate a trajectory (e.g., hike a trail shown by thin broken line 630 on a map 620 in FIG. 6B). Individual users may capture video and/or photo content during the hike using one or more capture device, e.g., device 110 of FIG. 1A. The trail traversal may take time that may exceed recording and/or energy capacity of a given capture device when configured for continuous recording. User may elect to capture content at intervals, while recording metadata for the duration of the activity. A given capture device may include a GPS receiver and/or may be interfaced to a GPS receiver (e.g., 122 in FIG. 1A). Metadata available for the duration of the trajectory traversal may enable one to obtain the trajectory 630 using camera position information. Content capture intervals (shown by solid bold line segments 622, 624 for one user, and shown by bold broken line segments 626, 628 for another user), may be overplayed on the trajectory 630. An area and/or time of overlap (shown by curve 634) may be determined by analyzing position information associated with the content segments 622, 626. A highlight may be obtained based time/space of overlap. Content for the highlight may be displayed, e.g., images and/or video of a water fall shown in frame 638. It will be recognized by those skilled in the arts that the above description is exemplary and non-limiting. Various other uses for metadata and/or content proxy may be envisioned by those skilled in the arts given the present disclosure. For example, methodology described herein may be utilized to provide context for automotive endurance racing (e.g., race consisting of multiple laps), skiing/snowboarding, mountaineering, biking, attending an outdoor event (e.g., concert, amusement park), and/or other activity wherein camera position, and/or motion may be used to obtain context for content.

FIGS. 7A-7B present exemplary content and metadata displays useful for displaying contents of session container in accordance with some implementations. Displays 700, 750 may be effectuated by a computing apparatus (e.g., 160 of FIG. 1D). Data shown and described with respect to FIGS. 7A-7B may be obtained by multiple bike riders on a trail. Individual riders may utilize a data acquisition system including an action camera, heart rate monitor, GPS receiver, IMU, and/or other sensors. In some implementations system 100 of FIG. 1A may be utilized. Display 700 in FIG. 7A may present a video frame obtained by one of the riders (rider A 702). The video frame in display 700 presents rider A view of the surroundings including another rider (rider B 704) ahead on the trail 706.

The display 700 may include a track map 630 with current position 732 of one or more riders. Track map may be obtained using position metadata stored in a session file associated with the activity. The session file may include multiple video and/or photo segments. Panel 740 may provide user interface elements useful for navigating contents of the session. The UI panel 740 may include a timeline displaying timing 742, intervals of acquired video/photo content (e.g., hashed bars 744, 746, 748), intervals wherein metadata may be obtained (e.g., 746). Current position slider 742 may be displaced along the timeline to scroll/scrub through metadata and content.

The display panel 700 may include information display dashboard 710. The dashboard may include information related parameters of one or more participants of the activity, including, e.g., speed and heart rate (HR) of rider A, rider B (712, 714), and rider C.

Display 750 in FIG. 7B may utilize bubble GUI elements to present user statistics, e.g., bubble element 752 for rider A, element 754 for rider B visible in the frame. Information for rider(s) not visible in the image on the display 750 may be presented in a dashboard (e.g., such as the dashboard 710 of FIG. 7A) and/or in a floating bubble element disposed proximate to position of the rider(s) not visible in the frame 750.

In some implementations, information displays (e.g., 700, 750) may be obtained by a computerized system (e.g., 180 of FIG. 1D), a computerized user interface device (e.g., device 120 in FIG. 1A), a smartphone, a smart watch, an action camera device featuring a display, and/or other device configurable to display image content. In some implementations, the user interface device may be configured to provide metadata information (e.g., position, heart rate from smart watch). The computerized system may include computer executable instructions configured to automatically detect and/or identify one or more persons that may be present in the video (e.g., rider B 704 in FIG. 7A). The computer executable instructions may be configured to obtain a variety of displays, e.g., switch between views of individual riders, follow one or more riders, and/or other displays. One or more components of content acquisition system of one rider may be configured to wirelessly communicate with one or more components of the content acquisition system of another rider.

In one or more implementations, the display 700, 750 may be configured to present video of one or more riders (e.g., 702, 704 in FIGS. 7A-7B). By way of an illustration, a user interface device 703 available to rider 702, may be configure to present video acquired with a capture device available to rider 702 (e.g., a chest-mounted camera as illustrated in FIG. 7A). Upon receiving an indication, the user interface device 703 may be configured to present video from another source (e.g., camera device of rider 704). In one or more implementations, the indication may include a user input (e.g., touch, button press, audio command, shake, and/or another user input); timer event (e.g., scheduled toggle of video feed from multiple cameras); a highlight event based on one or more parameters breaching a threshold (e.g., rider 704 wiping out, speeding up, slowing down), and/or other sensor information that may be associated with one or more capture devices and/or riders.

Metadata information from a given metadata source may be broadcasted to other destinations. Metadata information (e.g., session container metadata track) of a content acquisition system (e.g., system 100 of FIG. 1A of rider 702 in FIG. 7A) may be broadcasted to one or more other content capture systems (e.g., capture system of rider 704 in FIG. 7B). In some implementations, the metadata broadcast destination(s) may be configured based on pairing operation between two or more devices (e.g., capture device (e.g., 110 of FIG. 1A) of one rider may be paired with a capture device of another rider; a sensor (e.g., GPS 122, heart rate 124) of one rider may be paired with capture devices of multiple riders). It will be appreciated by those skilled in the arts that the above examples are not limiting and serve to illustrate principles of the disclosure and various other configurations may be utilize, e.g., ad-hoc, dynamic pairing, swarm, private cloud, and/or other data exchange configurations. Metadata information obtained from other sources/locations (e.g., metadata for rider 704 obtained by rider 702, also referred as distant metadata) may be analyzed. Highlights may be determined based on analysis of the distant metadata and/or local metadata (e.g., metadata obtained by the system of rider 702). In some implementations, distant metadata information may be presented at a local display, e.g., distant rider 704 position 734 in the local display 700 of rider 702. In some implementation, a wherein a highlight (e.g., 465 in FIG. 4D) may correspond to content (e.g., video, image) that may be associated with a distant content source (e.g., content capture system of rider 704 in FIG. 7A), the local content presentation process (e.g., of rider 702) may request provision of the distant content from the distant content acquisition system. The content may be provided using, e.g., wireless radio link such as link 216 described with respect to FIG. 2A. The content provided by distant source may include a higher data rate content (e.g., full-resolution, full frame rate) content available to the distant capture system (e.g., 1440p, 60 fps); reduced data rate content (e.g., 320× 180 pixel images at 5 fps, one or more still images, and/or other content configurations configured commensurate with wireless link parameters (e.g., transmission throughput, latency, energy use, and/or other parameters).

In some implementations, an image display (e.g., 700, 750) may be configured to include picture in picture (PiP)) display comprising video feeds from multiple cameras. By way of an illustration shown in FIG. 7B, larger display 750 may present video from the body mounted camera of rider 702, display element 760 may be configured to present feed from another capture device (e.g., rear mounted camera of rider 702, and/or camera of rider 704). Video sources for individual display elements may be pre-configured and/or selected dynamically, e.g., based on detecting a moment of interest (highlight event). By way of a non-limiting illustration, at a given time the main display 750 may be configured display rider 702 content; PiP display may be configured to display rider 704 content. Based on detecting a highlight, to switch PiP content with the main display content such as to display rider 704 content in main display 750.

In some implementations, when presenting content of a given session, presentation system and/or user thereof may request a portion of content associates and/or stored in another session container. By way of a non-limiting illustration, a content presentation system (e.g., 180 of FIG. 1D) may be configured to present content obtained by rider 702 of FIG. 7A. Such content may be stored in a session container, e.g., 490 in FIG. 4D. The metadata portion of the container 490 may include metadata obtained by the capture system of rider 702. The metadata portion of the container 490 may include metadata information obtained by the capture system of rider 704. In some implementations, the metadata of rider 704 may be broadcasted to the capture system of rider 702 as a part of content acquisition. In one or more implementations, session container information (e.g., metadata) of one session container may be shared with another session container using, e.g., metadata capture methodology described with respect to FIGS. 2A-2C. Session container may include content proxy (e.g., imaging content proxy 536 in FIG. 5B). In formation of a given session container may be analyzed in order to, e.g., obtain one or more moments of interest (highlight). Based on detecting a highlight (e.g., associated with track segment(s) denoted by hashed segments denoted by arrows 602. 606, 608 in FIG. 6A), a video/image content associated with the highlight and present in the given session container may be presented (e.g., image in panel 700 in FIG. 7A). In some implementations, the video/image content associated with the highlight (e.g., associated with track segment denoted by hashed segment 614 in FIG. 6A) may be present in another the session container. Such content may be requested via e.g., request to share as a part of content presentation process operable by, e.g., the system 180 of FIG. 1D.

Figure 9A:
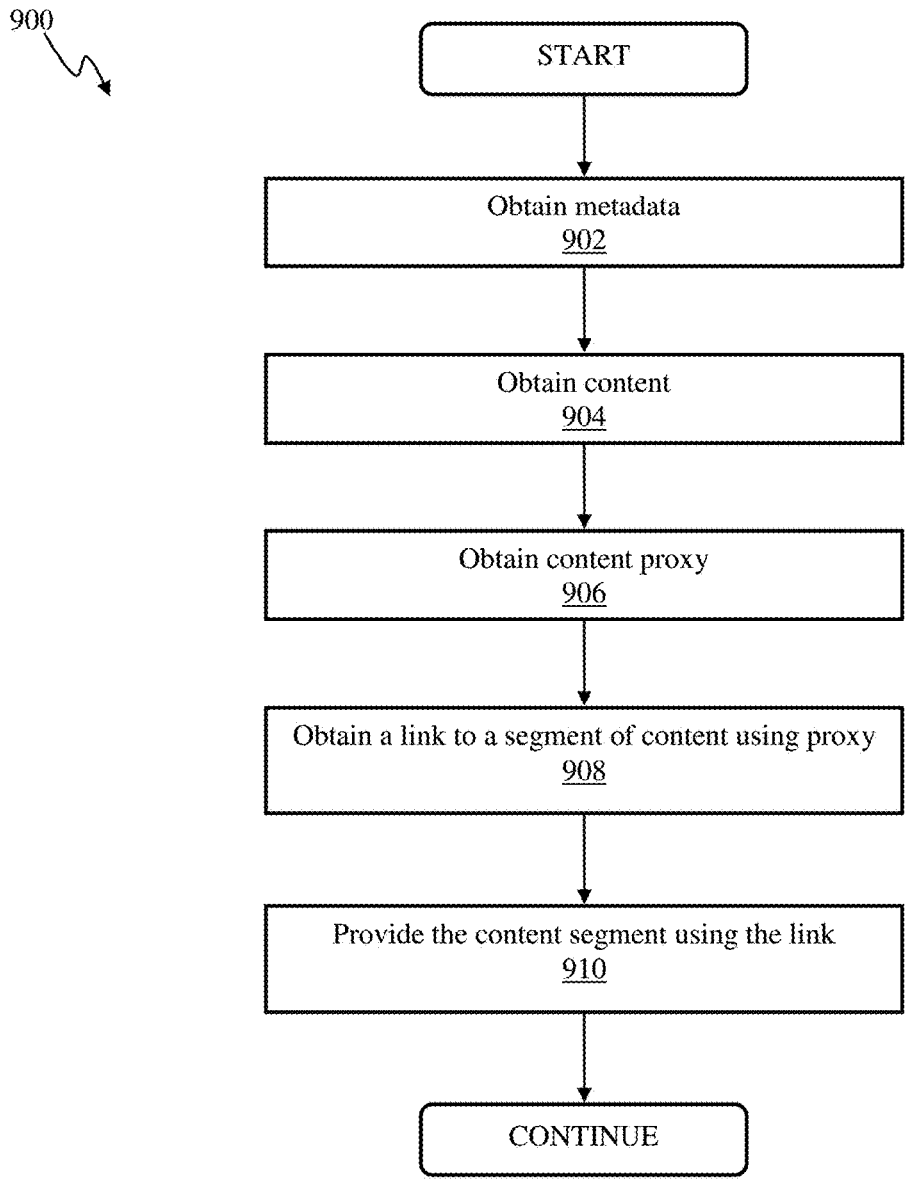
FIG. 9A is a logical flow diagram illustrating a method for use of content proxy for providing a content segment in accordance with one implementation.
Figure 9B:
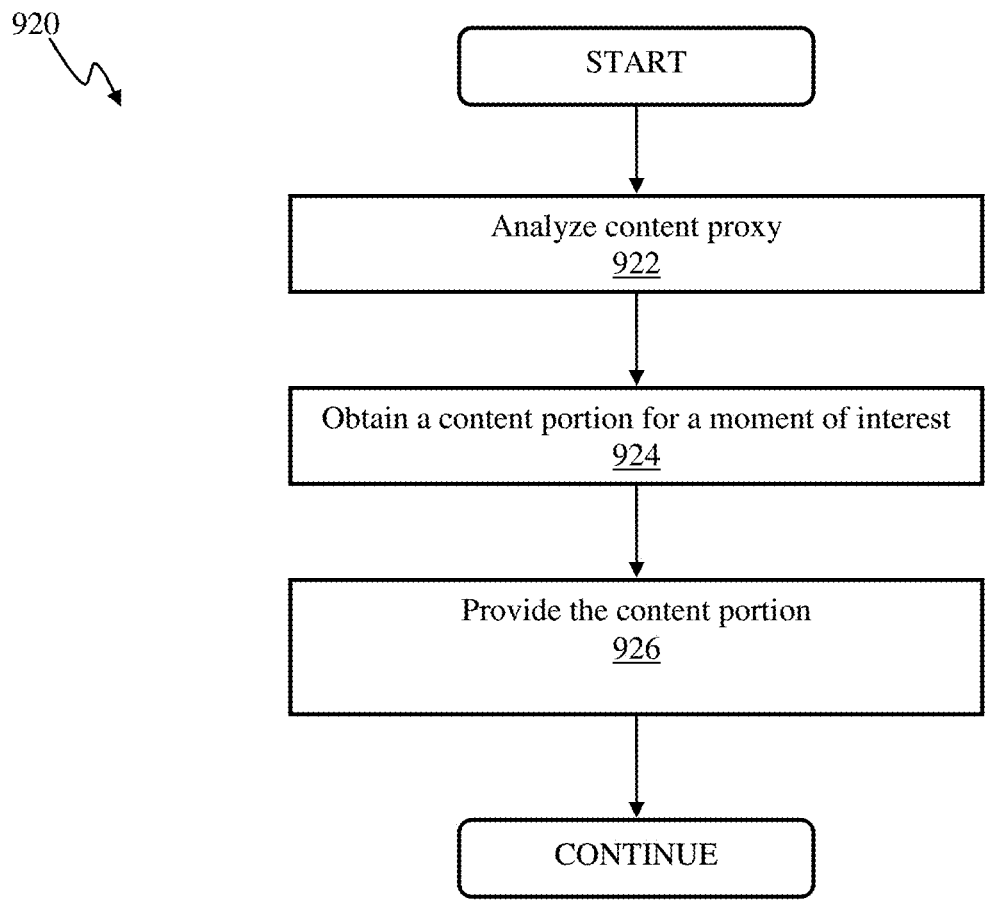
FIG. 9B is a logical flow diagram illustrating a method for highlight determination based on content proxy in accordance with one implementation.
Figure 10:
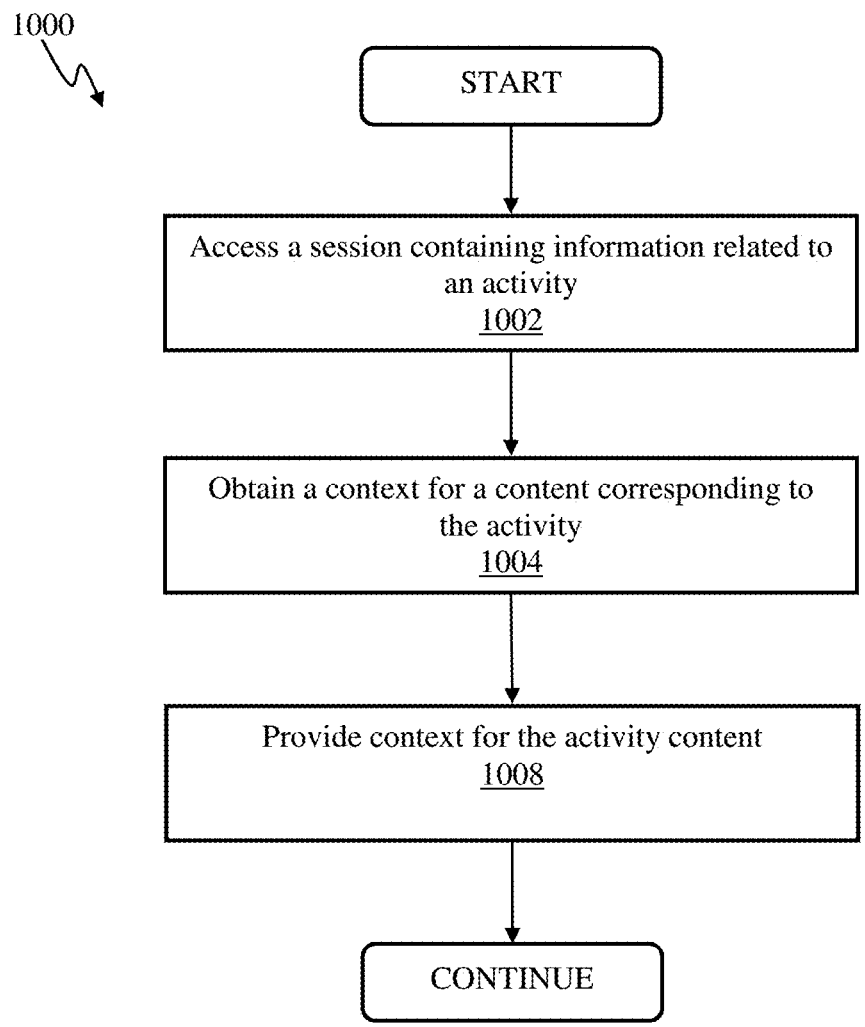
FIG. 10 is a logical flow diagram illustrating a method for displaying content and context based on the metadata of a session in accordance with one implementation.
Figure 11A:
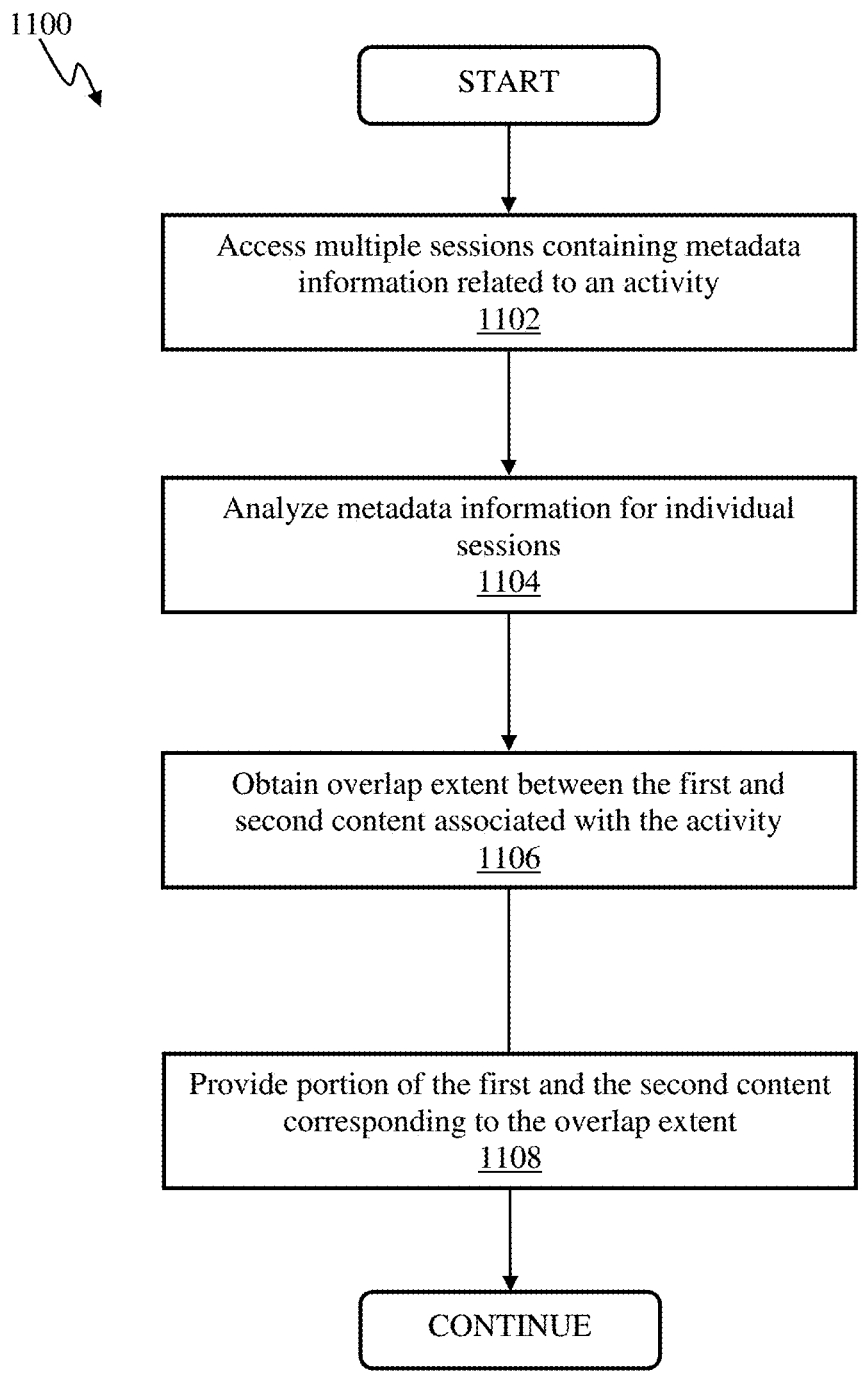
FIGS. 11A-11B are logical flow diagrams illustrating use of session container information for multicamera content synchronization and/or display in accordance with some implementations.
Figure 11B:
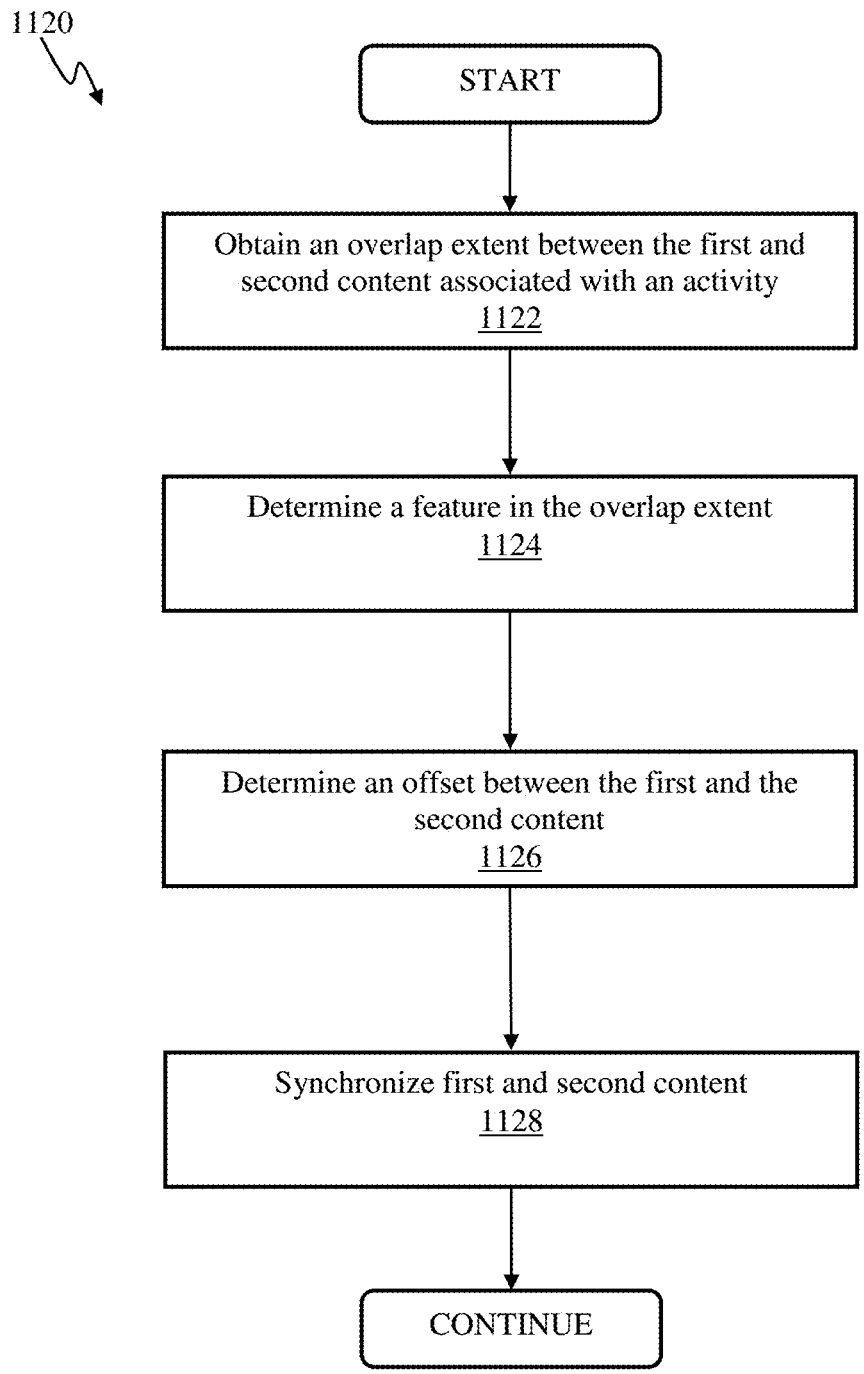

FIGS. 9A-10 illustrate methods 900, 920, 1000 for obtaining and/or using content proxy in accordance with some implementations of the present disclosure. FIGS. 11A-11B illustrate methods 1100, 1120 for using metadata information that may be provided in a session container in accordance with some implementations of the present disclosure. The operations of methods 900, 920, 1000, 1100, 1120 presented below are intended to be illustrative. In some implementations, methods 900, 920, 1000, 1100, 1120 may be accomplished with one or more additional operations not described, and/or without one or more of the operations discussed. Additionally, the order in which the operations of methods 900, 920, 1000, 1100, 1120 are illustrated in FIGS. 9A-11B and described below is not intended to be limiting.

In some implementations, methods 900, 920, 1000, 1100, 1120 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 900, 920, 1000, 1100, 1120 in response to instructions stored electronically on an electronic storage medium. The one or more processing devices may include one or more devices configured through hardware, firmware, and/or software to be specifically designed for execution of one or more of the operations of methods 900, 920, 1000, 1100, 1120. Operations of methods 900, 920, 1000, 1100, 1120 may be effectuated by one or more capture devices and/or computerized systems including these described with respect to FIGS. 1A-1D.

FIG. 9A illustrates use of content proxy for providing a content segment in accordance with one implementation. Method 900 of FIG. 9A may be implemented by, e.g., system 160 of FIG. 1C during an activity.

At operation 902 of method 900 metadata may be obtained. In some implementations, the metadata may include information that may be associated with the activity (e.g., hiking, surfing, biking, driving), information associated with capture of the content, sensor information, and/or other information. Metadata acquisition may be effectuated for the duration of the activity (e.g., bike ride along trajectory 600 of FIG. 6A, hike along a tail associated with the elevation shown by curve 800 of FIG. 8, and/or other activity). Metadata acquisition may be effectuated using a lower-power state of the capture device, e.g., such as described in detail in U.S. patent application Ser. No. 15/001,038, entitled "METADATA CAPTURE APPARATUS AND METHODS" filed herewith on Jan. 19, 2016, the foregoing being incorporated herein by reference in its entirety. In one or more implementations, operations 902 may be performed by one or more physical processors executing a metadata component the same as or similar to the metadata component 168 shown in FIG. 1C and described herein.

At operation 904 content may be obtained. The content may include audio, video, photo content and/or combination thereof. In some implementations, the content may be obtained by an action camera described herein during the activity. Content capture may be effectuated for the duration of the activity or for a portion of the activity duration. Acquired content may correspond, e.g., to one or more content entries described with respect to FIGS. 3A-7B. In one or more implementations, operations 904 may be performed by one or more physical processors executing a content component the same as or similar to the content component 170 shown in FIG. 1C and described herein.

At operation 906 content proxy may be obtained. In some implementations, the content proxy may be obtained from the metadata. By way of an illustration, the content proxy may include accelerometer and/or gyro information provided by an IMU and/or position information provided by a GPS. Data rate of the metadata may be reduced (e.g., down sampled) for the purposes of obtaining the content proxy. In one or more implementations of image (e.g., video and/or photo) content the content proxy may be obtained using reduced data rate version of the image content. By way of an illustration, proxy for video content may include multiple image thumbnails of smaller size (e.g., 190 pixels by 120 pixel compared to 1920×1080 pixels) obtained at a reduced frame rate (e.g., 1 fps) compared to the video that may be acquired at 30 fps. In one or more implementations, operations 906 may be performed by one or more physical processors executing a proxy determination component the same as or similar to the proxy determination component 172 shown in FIG. 1C and described herein. Content proxy may be configured to provide temporal correspondence to the content. In some implementations, the content proxy may include temporal information configured to relate a given element of proxy (e.g., image thumbnail) to a respective location within the content (e.g., index of full resolution image, time of the image and/or other information).

At operation 908 link to a segment of the content using the proxy may be obtained. The link may be determined based on a moment of interest (highlight). In some implementations the moment of interest may be determining based on evaluation of the content proxy information. By way of an illustration, metadata proxy comprising motion sensor information may be analyzed in order to determine moment(s) of greatest motion. Lower data rate image-based proxy may be analyzed to obtain scene change, and/or determine a given scene of interest. The link may include a pointer to a storage container (e.g., MP4, MOV file) wherein the high data rate image content may be stored; timing information (e.g., in/out time, frame number, time stamp); and/or other information. In one or more implementations, operation 908 may be performed by one or more physical processors executing a proxy and/or a highlight component the same as or similar to the proxy component 190 and/or highlight component 192 shown in FIG. 1D and described herein.

At operation 910 the segment of content using the link obtained at operation 908 may be provided. In some implementations, operations 910 may include downloading the segment from a remote depository (e.g., cloud storage, Network attached storage (NAS), external drive, or another depository) to a resource restricted device (e.g., portable communications device). In one or more implementations, operations 910 may include uploading the segment to a remote depository for subsequent viewing and/or sharing. In some implementations, operation 910 may be performed by one or more physical processors executing a content distribution component the same as or similar to the distribution component 194 shown in FIG. 1D and described herein.

In some implementations, proxy determination methodology described herein may be utilized to obtain content proxy during and/or as a part of content acquisition (e.g., during activity, e.g., such as described with respect to FIGS. 6A-7B). In one or more implementations, the proxy determination may be performed on a previously acquired content (post capture). By way of an illustration, a content library containing multiple content entries, e.g. 466, may be evaluated to obtain content proxy of a reduced storage size compared to the content. In some implementations, proxy determination may be effectuated based on a user request provided via, e.g., a mobile computing device or another user interface device.

In some implementations, content determination operations of method 9A may be effectuated by a capture device (e.g., 110 of FIG. 1A) as a part of content acquisition. The content proxy may be provided to a remote device, e.g., device 120 of FIG. 1A and/or device 177 of FIG. 1C.

FIG. 9B illustrates a method for highlight determination based on content proxy in accordance with one implementation. In some implementations, operations of method 920 of FIG. 9B may be performed in some implementations by computerized system 180 of FIG. 1D.

At operation 922 content proxy may be analyzed. In some implementations, wherein the content proxy may include information related to content metadata (e.g., records 462, 46, 518, 542 shown in FIGS. 4D-5B and described herein, the proxy analysis may include statistical operations, machine learning operations, classification operations, and/or other operations configured to determine occurrence of one or more features (events) in the proxy. By way of an illustration, proxy analysis may include evaluation of one or more camera parameters (e.g., such as elevation 800 shown by curve in FIG. 8) in order to determine one or more moments of interest (e.g. events 802, 804 in FIG. 8). In one or more implementations, wherein the content proxy may include lower data rate content representation (e.g., image thumbnails, and/or records 512 524 shown in FIG. 5C and described herein, the proxy analysis may include image recognition, image color analysis, feature detection, object tracking, scene detection, classification operations, and/or other operations configured to determine occurrence of one or more features (events) in the image proxy information. In some implementations, scene change detection may include one or more of obtaining difference between pixels of multiple frames, (e.g., mean absolute difference, mean absolute frame difference, signed difference of mean absolute frame difference, absolute difference of frame variance, thresholding, principal component analysis, adaptive group of picture determination, color histogram, evaluation of spatial frequency of features (e.g., using discrete cosine transform (DCT)), DCT clustering, and/or other operations. Scene detection and/or scene change detection operation may be configured to obtain one or more scenes within the content, scene duration, and/or other parameters. In some implementations, information related to detected scenes (e.g., time, frame index) may be stored in a session container.

By way of an illustration, proxy analysis may include evaluation of multiple thumbnails in order to determine scene transition (e.g., accent to a top of the mountain shown by curve 804 in FIG. 8). In one or more implementations, proxy analysis may include thumbnail evaluation, location evaluation, and/or camera motion evaluation in order to determine a given scene. By way of a non-limiting illustration, metadata and/or thumbnails may be evaluated to detect a scene in the content, e.g., hill 724 in frame 700. The hill 724 may be detected using information acquired by one or more capture devices or systems, e.g., information captured by device of rider 704 at one time instant, and information captured by device of rider 702 at another time instant (e.g., subsequent to the rider 704). In some implementations, operations 922 may be performed by one or more physical processors executing a proxy component the same as or similar to the proxy component 190 shown in FIG. 1D and described herein.

At operation 924 a portion of the content for a moment of interest may be obtained. In some implementations of imaging content, the content portion may include a video clip, a sequence of frames, and/or a combination thereof. The moment of interest may correspond to one or more events (features) obtained during operation 922 as described herein. Operation 924 may include presentation to a user one or more image frames associated with one or more features determined from the content proxy analysis operation 922. The content portion determination may include information related to container storing the content (e.g., MP4, MOV container), timing of the moment within the content (e.g., time in, time out, start time, duration, frame number, frame count, and/or other information). In one or more implementations, operations 924 may be performed by one or more physical processors executing a highlight component the same as or similar to the highlight component 192 shown in FIG. 1D and described herein.

At operation 926 a portion of the content may be provides. The portion of the content may include information obtained at operation 924. At operation 926 a segment of content corresponding to the moment of interest (highlight) may be provided to users. The content provision may include providing an identification of a time in/time out, start time and a duration, or other indications configured to enable identification of a segment of content (e.g., video clip, sequence of images) corresponding to the highlight determined at operation 924. By way of non-limiting example, a recommendation may be provided to the user that conveys the identification of the first moment of interest within the first video clip and/or other moments of interest within other video clips. In some implementations, operation 926 may include downloading a content portion from a remote depository (e.g., cloud storage, Network attached storage (NAS), external drive, or another depository) to a resource restricted device (e.g., portable communications device). In one or more implementations, operations 926 may include uploading the content portion to a remote depository for subsequent viewing and/or sharing. In some implementations, operation 926 may be performed by one or more physical processors executing a content distribution component the same as or similar to the distribution component 194 (shown in FIG. 1D and described herein).

FIG. 10 illustrates a method of displaying content and context based on the metadata of a session in accordance with one implementation. In some implementations, operations of method may be performed by a computerized apparatus and/or computerized system the same as or similar to the system 180 shown in FIG. 1D and described herein.

At operation 1002 of method 1000 a session containing information related to an activity may be accessed. The session may comprise metadata information including, e.g., those shown and described with respect to FIGS. 3A-7B. By way of an illustration, session container 420 of FIG. 4B may include a metadata track (e.g., 340 of FIG. 3A) that may include one or sensor records (e.g., position, heartrate, and/or other) obtained during a bike ride (e.g., described with respect to FIGS. 7A-7B). The session container may further include one or more content segments of content (e.g., video clips) described with respect to FIG. 4B.

At operation 1004 a context for the content acquired during the activity may be obtained. In some implementation of a biking, mountaineering, and/or other travel activity, the context may include position information (e.g., track, distance travel), activity statistics (e.g., average speed, calories burned, elevation gain/loss and/or other parameter). In one or more implementations of e.g., cyclic activity (e.g., endurance automotive race consisting of multiple laps) the context may include total distance, current lapse number, total number of lapses, total time, and/or other parameter.

At operation 1008 the context may be provided for the content acquired for the activity. In some implementations, the context provision may include effectuating a dashboard display, e.g., such as shown in FIGS. 7A-7B and described herein. In one or more implementations, the context provision may include communicating activity statistics to a target destination (e.g., electronic storage, portable communications device, a web client application, and/or other destination).

FIG. 11A illustrates a method of displaying content from multiple sources for an activity using metadata of a session in accordance with one implementation. In some implementations, operations of method may be performed by a computerized apparatus and/or computerized system the same as or similar to the system 180 shown in FIG. 1D and described herein.

At operation 1102 of method 1100 multiple sessions containing metadata information related to an activity may be accessed. In some implementation, individual session containers may be obtained by individual capture devices and/or capture systems (e.g., system 100, 150 of FIGS. 1A-1B) of two or more users. Individual session containers may include information from one or more metadata sources (e.g., metadata track 340 of FIG. 3A and/or 430 of FIG. 4B) obtained during an activity (e.g., trail traversal described with respect to FIG. 6B). Individual capture devices may obtain content (referred to as the first content and the second content and corresponding, e.g., to time periods depicted by curve segments 622, 624, 626, 628 in FIG. 6B).

At operation 1104 metadata information for individual session may be analyzed. Metadata analysis may include determining time interval for metadata capture duration, time intervals for content capture durations, position, elevation, and/or other information.

At operation 1106 an overlap extent between the first and second content associated with the activity may be obtained. In some implementation, the overlap extent may correspond to a temporal overlap of a portion of the first content and a portion of the second content (e.g., first user and second user acquiring content at the same time, e.g., 11:15). In one or more implementation, the overlap extent may correspond to spatial proximity of capture device locations associated with the first and the second content. The first user and the second user acquiring content at a landmark (e.g., waterfall shown in frame 638 in FIG. 6B) during a hike. The overlap extent may correspond to a spatio-temporal proximity of the respective capture devices when acquiring content. By way of an illustration, two skiers while descending down a slope may capture content. The overlap extent may correspond to a time period wherein the skiers are within a given range from one another. In some implementations, operation 1104 and/or 1106 may be performed by one or more physical processors executing a proxy component and/or a highlight component the same as or similar to proxy component 190 and/or the highlight component 192 and/or (shown in FIG. 1D and described herein). In some implementations, the overlap determination operation 1106 may be configured to obtain a content correlation record including instances of one or more occurrences of the overlap extent between the first and second content. The content correlation record may be stored at a remote depository (e.g., at a GoPro server operating a user content portal), locally (e.g., at a capture device, user interface device, a computer), and/or other storage location.

In one or more implementation, one or more operations of method 1100 (e.g., operations 1102, 1104, 1106, 1108) may be performed by a client computing platform (e.g., a capture device, e.g., 130 of FIG. 1B, smartphone, tablet, laptop computer, home media center, and/or other client computing platform). In one or more implementation, one or more operations of method 1100 (e.g., operations 1102, 1104, 1106, 1108) may be performed by a remote computing platform, e.g., a cloud computing service, a server operating a Web portal interface, and/or other computing platform.

At operation 1108 portion of the first and the second content corresponding to the overlap extent may be provided. In some implementations, operation 1108 may include displaying portion of the first and the second content (e.g., displaying a scene from multiple viewpoints, displaying an object (a landmark) different time instants). By way of an illustration, hill 724 in FIG. 7 may be viewed from viewpoint of rider 702 and from viewpoint of rider 704. In one or more implementations, operation 1108 may include sharing content portions (e.g., one user may share their content with another user and/or vice versa). In some implementations, operation 1108 may be performed by one or more physical processors executing a content distribution component the same as or similar to the distribution component 194 (shown in FIG. 1D and described herein).

FIG. 11B illustrates a method for synchronization of content from multiple sources using session metadata in accordance with one implementation. Operations of method 1120 may be utilized for manipulating content obtained by a given user or multiple users using multiple cameras. By way of an illustration, content of a pair of skiers may be synchronized even when real time clock of the capture devices used by the skiers may not be synchronized during content acquisition.

At operation 1122 an overlap extent between the first and second content associated with the activity may be obtained. In some implementation, the overlap extent may correspond to a temporal overlap of a portion of the first content and a portion of the second content (e.g., first user and second user acquiring content at the same time, e.g., 11:15). In one or more implementation, the overlap extent may correspond to spatial proximity of capture device locations associated with the first and the second content. Dimension of the overlap region may be configured in accordance with a given application. By way of an illustration, when riding a bike trail, the spatial proximity may be configured within few meters (e.g., 0.5 m to 5 m); when mountaineering, proximity may be configured to between 1 m and 1000 m. —The first user and the second user acquiring content at a landmark (e.g., waterfall shown in frame 638 in FIG. 6B) during a hike. The overlap extent may correspond to a spatio-temporal proximity of the respective capture devices when acquiring content. By way of an illustration, two skiers while descending down a slope may capture content. The overlap extent may correspond to a time period wherein the skiers are within a given range from one another. In some implementations, operation 1122 may be performed by one or more physical processors executing a proxy component and/or a highlight component the same as or similar to proxy component 190 and/or the highlight component 192 and/or (shown in FIG. 1D and described herein).

At operation 1124 a feature may be determined in content for the overlap extent. In some implementations, operation 1124 may include determining first version of a feature in the first content acquired by one user/capture device; and determining a second version of the feature in the second content acquired by another user/capture device. By way of an illustration of skiing activity, the feature may correspond to a tree, chair lift tower. Feature determination may be effectuated using any applicable methodologies including classification, machine learning, computer vision techniques such as Canny, Level curve curvature, Features from accelerated segment test (FAST), Laplacian of Gaussian, Difference of Gaussians, Determinant of Hessian, smallest univalue segment assimilating nucleus, maximally stable extremal regions (MSER), curvature based detectors, Grey-level blobs, and/or other approaches. In some implementation, feature determination may be effectuated by a remote device (e.g., 177 in FIG. 1C, 120 in FIG. 1A) and/or computerized apparatus (e.g., 180 of FIG. 1D) such as e.g., mobile communications device, tablet computer, desktop computer, laptop computer, a server, a cloud computing service, and/or other apparatus. Feature determination process may be modified to provide updates, additional future detection algorithms, computational efficiency improvements, feature match improvements and/or other updates. Such updates may be readily available to users for download and use without necessitating updates of operational code of capture devices (e.g., 110 in FIG. 1A). Such approach may reduce operational overhead associated with support of capture devices, reduce in-field failure rate, and/or increase customer satisfaction. Such updates may include activity profiles wherein image analysis and/or metadata analysis algorithm(s) may be tailored for a given activity. By way of an illustration, surfing activity profile may be configured to detect objects on a blue/white background, while automotive racing profile may be configured to detect objects of color on gray/black background.

In some implementations, the overlap determination operation 1122 and/or feature detection operation 1124 may be configured to obtain a content correlation record including instances of one or more occurrences of the overlap extent between the first and second content. The content correlation record may be stored at a remote depository (e.g., at a GoPro server operating a user content portal), locally (e.g., at a capture device, user interface device, a computer), and/or other storage location At operation 1126 an offset between the first and the second content may be obtained. In some implementations, the offset determination may include determining a first time instant associated with the first version of the feature, and determining a second time associated with the second version of the feature. In some implementations of imaging content, the first and/or the second time instants may correspond to frame time, frame index of a frame wherein the respective feature version may be located in the first/second content. In some implementations, the offset determination may be effectuated by a capture device (e.g., device 110 of FIG. 1A and/or camera of rider 702 of FIG. 7A) using proxy associated with content obtained by another device (e.g., camera of rider 704 of FIG. 7A and/or remote device 177 of FIG. 1C). In some implementations, content time offset may be obtained based on an evaluation of metadata information associated with the content.

At operation 1128 first and second content may be time-aligned (synchronized). In one or more implementations, the content synchronization may include providing a time difference (an offset) between the first and the second content to a destination (e.g., content display application, content analysis application, disk storage, and/or other destination), applying the time difference to one of the content portions, and/or other operations.

Methodology for storing content proxy (e.g., in a session container) for the duration of an activity described herein may facilitate content access and/or selection from a resource restricted device (e.g., smartphone, tablet computer, and/or other device that may be characterized by a limited amount of available energy, communications bandwidth, processing capacity, and/or other resource (e.g., electronic storage). Using the content proxy, one or more characteristics (e.g., camera motion, position, scene representation from thumbnails, user heartrate, and/or other characteristics) associated with the activity may be evaluated without necessitating decoding of a full length video file.

Metadata acquisition and/or storage methodology of the present disclosure may advantageously facilitate provision of context for captured audio/video content for a duration of the recorded metadata that may exceed duration of the content capture. By way of an illustration, when riding a bike and/or mountaineering for an extended period of time (e.g., longer than 4 hours in one implementation), metadata (e.g., camera position, camera motion, user heart rate, cadence) may be captured. Image (e.g., video, photo) content may be captured during portions of the activity (e.g., during a mountain climb/descent, hairpin turn). When metadata (e.g., elevation and/or position information) may be available for the duration of activity, the metadata may be used to provide a track for one or more portions of the content that may be captured.

In some implementations wherein multiple users may participate in an activity (e.g., multiple users watching an event such as concert, game, play, hiking a trail, riding a bike trail, surfing, skiing) metadata captured by camera of one user may provide context for video captured by other user(s). Metadata captured by individual capture devices may be rebroadcasted during activity (e.g., using the system of FIG. 2A) and/or exchanged post capture (e.g., using system of FIG. 2C). Use of metadata for the whole duration of the activity (or for a portion of the activity that extends beyond the duration of the video) may enable determination of activity parameters such as track on a map, elevation gain/loss, distance travel, energy used in units of Metabolic Equivalent of Task (MET), generated power, calories burned, cadence, gate, heart rate statistics, and/or other parameters.

In some implementations, the session file may contain metadata stored at a reduced rate compared to sample rate of the metadata that may be stored with the video.

In some existing approaches metadata information may be stored in a video file for a given video frame. In order to access metadata information for example, 1 hour into the video, the video file may processed (e.g., decoded). Such operation may be lengthy, computationally and/or energy intensive. Using metadata storage approach of the present disclosure, wherein metadata storage may be decoupled from the video storage, metadata track of the session container may be readily accessed throughout the activity without necessitating decoding of the video. Such configuration may reduce computational load onto and/or energy use by, e.g., mobile communications device.

Using metadata as content proxy may enable storing information for an activity (e.g., multi-hour trail traversal) in a container that may occupy 1% or less of storage space that may be occupied by video for the duration of the activity. By way of a non-limiting illustration, a 4 GB video file may be represented by metadata container of about 200 kB in size.

Methodologies for decoupling metadata information and video/image content capture, including those described herein, may extend operational duration of a capture device for a given battery energy capacity. By way of an illustration, while in video capture and recording mode a capture device (e.g., 110 in FIG. 1A) may utilize between about 1 and 2 joules per second (1 W to 2 W). While in metadata acquisition mode, the capture device may consume less than 0.3 W. Given these values, a 4.4 Wh battery may last in excess of 14 hours for capturing metadata, compared to slightly over 2 hours while capturing video.

Methodologies for obtaining a session container including content proxy information using metadata and/or image content may enable to obtain a reduced size data base for content associated with an activity. A session container may include information related to content and/or information related to portions of the activity wherein the content may not be available (such as portions of the track 600 denoted by thin line (e.g., 604 in FIG. 6A). Metadata information obtained and stored for portions of the activity for which the content may not be available may provide a context for the available content. By way of an illustration, position information may enable to obtain trajectory for a race (e.g., track 600), may enable to obtain activity statistics (e.g. distance travel, average speed, average heart rate, best time around a given portion of a race track during an endurance race, and/or other parameters). Moments of interest may be identified using metadata information of a session container. Content associated with one or more moments of interest and available in a session container may be displayed. Content associated with one or more moments of interest and unavailable in a given session container may be requested via a request to share. Content associated with one or more moments of interest and available in a given session container may be provides in response to a request to share. Such methodology may enable ad-hoc sharing of content in absence of centralized depository infrastructure (e.g., between two or more users performing an activity in a location remote from cellular and/or internet service (e.g., skiing, biking, trekking, boating, and/or other activity).

Image proxy may provide context for content capture, e.g., to enable one to obtain an assessment of image quality, that may be associated with image capture. By way of an illustration, thumbnail images may be used to determine orientation of the capture device (e.g., a camera) within the visual scene (e.g., pointing into ground, up, into one's chest), framing of a shot (e.g., part of subject's body cut off), determine scene transition (e.g., from forest into a plane), and/or obtain other parameters of the activity that may be unattainable in absence of image information for portions of the activity in between video clips (e.g., portion 532 in-between portions 537, 539 in FIG. 5B).

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans, etc.), Binary Runtime Environment (e.g., BREW), and/or other machine code implementations.

As used herein, the terms "connection", "link", "transmission channel", "delay line", "wireless" means a causal link between any two or more entities (whether physical or logical/virtual), which enables information exchange between the entities.

As used herein, the terms "GoPro action camera", "GoPro actioncam" may be used to describe one or more of existing and/or future models of action cameras provided by GoPro, Inc., e.g., including but not limited, toHERO4 Black, HERO4 Silver, HERO4 Session, HERO, HERO+LCD, HERO3, HERO3+, HERO3+ Silver, and/or other models.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital information including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnee™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

It will be recognized that while certain aspects of the technology are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the technology. The scope of the disclosure should be determined with reference to the claims.

What is claimed is:

1. A non-transitory computer readable medium configured to store a plurality of computer-readable instructions which, when executed by one or more processors, are configured to:
    access a first content proxy containing information related to a first imaging content acquired by a first capture device having a first clock associated therewith, the first imaging content including a first sequence of images, the first content proxy including (i) a second sequence of images characterized by a first data rate configured lower than a second data rate of the first sequence of images, and (ii) one or more links to the images of the first sequence of images;
    access a second content proxy containing information related to second imaging content acquired by a second capture device having a second clock associated therewith, the second imaging content including a third sequence of images, the second content proxy including (i) a fourth sequence images characterized by a third data rate configured lower than a fourth data rate of the third sequence of images, and (ii) one or more links to the images of the third sequence of images;
    evaluate the images of the second sequence to obtain parameters related to one or more first scenes;
    evaluate the images of the fourth sequence to obtain parameters related to one or more second scenes;
    obtain an overlap between the one or more first scenes and the one or more second scenes such that a given scene occurring within the one or more first scenes occurs within the one or more second scenes;
    obtain a first link to an image of the first sequence of images corresponding to the given scene occurring within the one or more first scenes;
    obtain a second link to an image of the third sequence of images corresponding to the given scene occurring within the one or more second scenes; and
    provide the first link and the second link to a display process, the provision of the first link and the second link configured to enable display of the given scene based on stitching of the image of the first sequence of images and the image of the second sequence of images.

2. The non-transitory medium of claim 1, wherein the first data rate includes a first frame rate and the second data rate includes a second frame rate, and the first frame rate is lower than the second frame rate.

3. The non-transitory medium of claim 1, wherein the first data rate includes a first byte rate characterizing number of bytes per image of the second sequence of images and the second data rate includes a second byte rate characterizing number of bytes per image of the first sequence of images and the first byte rate is lower than the second byte rate.

4. The non-transitory medium of claim 3, wherein:
    the third data rate includes one or both of (i) a third frame rate, the fourth data rate including a fourth frame rate, the third frame rate lower than the fourth frame rate; and (ii) a third byte rate characterizing number of bytes per image of the fourth sequence of images, the fourth data rate including a fourth byte rate characterizing number of bytes per image of the third sequence of images, the third byte rate lower than the fourth byte rate.

5. A system for providing images, the system comprising:
    one or more physical processors configured by machine-readable instructions to:
        access a first content proxy containing information related to a first imaging content acquired by a first capture device having a first clock associated therewith, the first imaging content including a first sequence of images, the first content proxy including (i) a second sequence of images characterized by a first data rate configured lower than a second data rate of the first sequence of images, and (ii) one or more links to the images of the first sequence of images;
        access a second content proxy containing information related to second imaging content acquired by a second capture device having a second clock associated therewith, the second imaging content including a third sequence of images, the second content proxy including (i) a fourth sequence images characterized by a third data rate configured lower than a fourth data rate of the third sequence of images, and (ii) one or more links to the images of the third sequence of images;
        evaluate the images of the second sequence to obtain parameters related to one or more first scenes;
        evaluate the images of the fourth sequence to obtain parameters related to one or more second scenes;
        obtain an overlap between the one or more first scenes and the one or more second scenes such that a given scene occurring within the one or more first scenes occurs within the one or more second scenes;
        obtain a first link to an image of the first sequence of images corresponding to the given scene occurring within the one or more first scenes;
        obtain a second link to an image of the third sequence of images corresponding to the given scene occurring within the one or more second scenes; and provide the first link and the second link to a display process, the provision of the first link and the second link configured to enable display of the given scene based on stitching of the image of the first sequence of images and the image of the second sequence of images.

6. The system of claim 5, wherein the first data rate includes a first frame rate and the second data rate includes a second frame rate, and the first frame rate is lower than the second frame rate.

7. The system of claim 5, wherein the first data rate includes a first byte rate characterizing number of bytes per image of the second sequence of images and the second data rate includes a second byte rate characterizing number of bytes per image of the first sequence of images and the first byte rate is lower than the second byte rate.

8. The system of claim 7, wherein:
the third data rate includes one or both of (i) a third frame rate, the fourth data rate including a fourth frame rate, the third frame rate lower than the fourth frame rate; and (ii) a third byte rate characterizing number of bytes per image of the fourth sequence of images, the fourth data rate including a fourth byte rate characterizing number of bytes per image of the third sequence of images, the third byte rate lower than the fourth byte rate.

9. A method for providing images, the method performed by a computing system including one or more physical processors, the method comprising:
accessing, by the computing system, a first content proxy containing information related to a first imaging content acquired by a first capture device having a first clock associated therewith, the first imaging content including a first sequence of images, the first content proxy including (i) a second sequence of images characterized by a first data rate configured lower than a second data rate of the first sequence of images, and (ii) one or more links to the images of the first sequence of images;
accessing, by the computing system, a second content proxy containing information related to second imaging content acquired by a second capture device having a second clock associated therewith, the second imaging content including a third sequence of images, the second content proxy including (i) a fourth sequence images characterized by a third data rate configured lower than a fourth data rate of the third sequence of images, and (ii) one or more links to the images of the third sequence of images;
evaluating, by the computing system, the images of the second sequence to obtain parameters related to one or more first scenes;
evaluating, by the computing system, the images of the fourth sequence to obtain parameters related to one or more second scenes;
obtaining, by the computing system, an overlap between the one or more first scenes and the one or more second scenes such that a given scene occurring within the one or more first scenes occurs within the one or more second scenes;
obtaining, by the computing system, a first link to an image of the first sequence of images corresponding to the given scene occurring within the one or more first scenes;
obtaining, by the computing system, a second link to an image of the third sequence of images corresponding to the given scene occurring within the one or more second scenes; and
providing, by the computing system, the first link and the second link to a display process, the provision of the first link and the second link configured to enable display of the given scene based on stitching of the image of the first sequence of images and the image of the second sequence of images.

10. The method of claim 9, wherein the first data rate includes a first frame rate and the second data rate includes a second frame rate, and the first frame rate is lower than the second frame rate.

11. The method of claim 9, wherein the first data rate includes a first byte rate characterizing number of bytes per image of the second sequence of images and the second data rate includes a second byte rate characterizing number of bytes per image of the first sequence of images and the first byte rate is lower than the second byte rate.

12. The method of claim 11, wherein:
the third data rate includes one or both of (i) a third frame rate, the fourth data rate including a fourth frame rate, the third frame rate lower than the fourth frame rate; and (ii) a third byte rate characterizing number of bytes per image of the fourth sequence of images, the fourth data rate including a fourth byte rate characterizing number of bytes per image of the third sequence of images, the third byte rate lower than the fourth byte rate.

* * * * *